(12) United States Patent
Anderson et al.

(10) Patent No.: US 12,241,219 B2
(45) Date of Patent: *Mar. 4, 2025

(54) QUICK COUPLER

(71) Applicant: WEDGELOCK EQUIPMENT LIMITED, Upper Hutt (NZ)

(72) Inventors: Andre Richard Anderson, Featherston (NZ); Garth Colin Keighley, Upper Hutt (NZ); Andrew James Phillip Rider, Otaki (NZ); Michael Hugh James Rider, Otaki (NZ)

(73) Assignee: WEDGELOCK EQUIPMENT LIMITED, Upper Hutt (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,054

(22) Filed: Mar. 30, 2023

(65) Prior Publication Data

US 2023/0235526 A1    Jul. 27, 2023

Related U.S. Application Data

(63) Continuation of application No. 16/488,447, filed as application No. PCT/IB2018/055835 on Aug. 3, 2018, now Pat. No. 11,643,787.

(30) Foreign Application Priority Data

Aug. 4, 2017   (NZ) ........................................ 734332
Apr. 30, 2018  (NZ) ........................................ 742077

(51) Int. Cl.
    *E02F 3/36*    (2006.01)

(52) U.S. Cl.
    CPC .......... *E02F 3/3622* (2013.01); *E02F 3/3663* (2013.01); *E02F 3/3627* (2013.01); *E02F 3/3645* (2013.01); *E02F 3/365* (2013.01)

(58) Field of Classification Search
    CPC ..... E02F 3/3622; E02F 3/3663; E02F 3/3627; E02F 3/3645; E02F 3/365; A01B 59/002
    See application file for complete search history.

(56) References Cited

U.S. PATENT DOCUMENTS

| | | | | |
|---|---|---|---|---|
| 3,531,140 A | * | 9/1970 | Di Vita et al. ........ | A01B 59/062 172/275 |
| 3,572,759 A | * | 3/1971 | Baugh et al. ........ | A01B 59/062 172/430 |
| 3,807,769 A | * | 4/1974 | Thompson et al. ..... | B60D 1/04 172/272 |
| 4,398,745 A | * | 8/1983 | Azzarello et al. ........ | B60D 1/04 280/508 |
| 4,549,744 A | * | 10/1985 | Herr et al. ............... | B60D 1/04 280/416.2 |

(Continued)

*Primary Examiner* — Thomas B Will
*Assistant Examiner* — Joel F. Mitchell
(74) *Attorney, Agent, or Firm* — JCIP; Joseph G. Chu

(57) ABSTRACT

A coupler for securing an attachment to an earth working machine. The coupler comprises a coupler body that presents a receptacle having a capture region. A pin of an attachment can move into and out of the capture region. A retainer can capture the pin in the capture region but the retainer can be moved by a hydraulically driven driver to a position to allow release the pin from the capture region. A trigger that the pin will strike when the pin moves into or out of the capture region, decouples the driver from the retainer and the retainer is then allowed to be biased back to its retaining position by a spring.

20 Claims, 27 Drawing Sheets

(56) References Cited

U.S. PATENT DOCUMENTS

| | | | | |
|---|---|---|---|---|
| 4,958,848 A * | 9/1990 | Nash | B60D 1/04 | 280/509 |
| 6,422,805 B1 * | 7/2002 | Miller | E02F 3/3627 | 37/468 |
| 6,478,094 B2 * | 11/2002 | Alexander et al. | A01B 59/006 | 172/272 |
| 6,508,616 B2 * | 1/2003 | Hung | E02F 3/3618 | 37/468 |
| 6,922,926 B2 * | 8/2005 | Miller et al. | E02F 3/3618 | 37/468 |
| 6,964,122 B2 * | 11/2005 | Cunningham et al. | E02F 3/3663 | 37/468 |
| 7,530,405 B2 * | 5/2009 | Kollath et al. | A01B 59/062 | 172/272 |
| 7,828,070 B2 * | 11/2010 | Calvert et al. | E02F 3/3663 | 414/723 |
| 8,011,121 B2 * | 9/2011 | Daraie et al. | E02F 3/365 | 37/444 |
| 8,112,914 B2 * | 2/2012 | Miller et al. | E02F 3/3622 | 37/468 |
| 8,262,310 B2 * | 9/2012 | Sikorski et al. | E02F 3/3618 | 37/468 |
| 8,585,345 B2 * | 11/2013 | Sikorski et al. | E02F 3/3663 | 414/723 |
| 8,622,645 B2 * | 1/2014 | Hill | E02F 3/3663 | 37/468 |
| 8,782,931 B2 * | 7/2014 | Balemi | E02F 3/3663 | 37/468 |
| 9,217,235 B2 * | 12/2015 | Robl et al. | E02F 9/2296 | |
| 9,388,549 B2 * | 7/2016 | Friedrich | E02F 3/365 | |
| 9,469,965 B2 * | 10/2016 | Hill | E02F 3/365 | |
| 9,834,904 B2 * | 12/2017 | Friedrich | E02F 3/3618 | |
| 2011/0313625 A1 * | 12/2011 | Miller et al. | E02F 3/3663 | 701/50 |
| 2015/0330053 A1 * | 11/2015 | Ravindran | E02F 3/3618 | 403/91 |

* cited by examiner

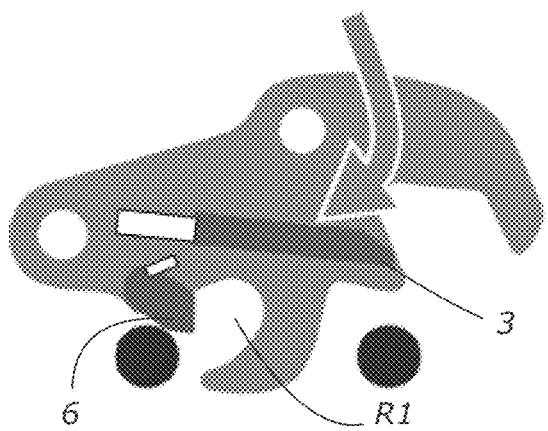
FIGURE 7
*(Prior Art)*
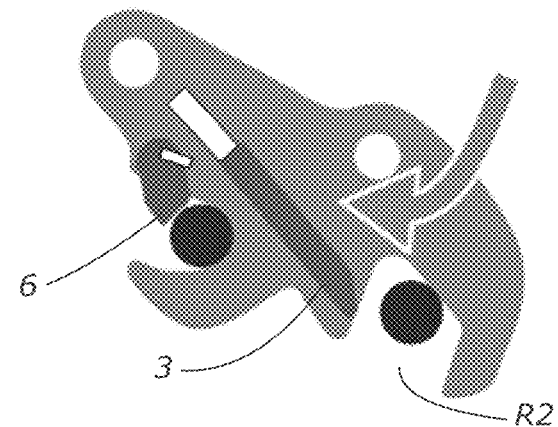
FIGURE 8
*(Prior Art)*
FIGURE 9
*(Prior Art)*
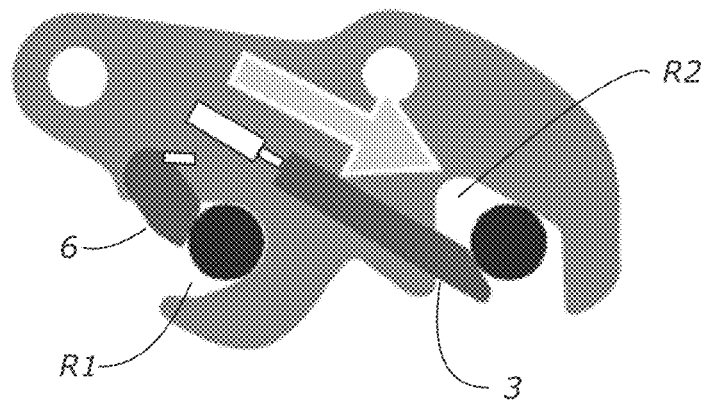
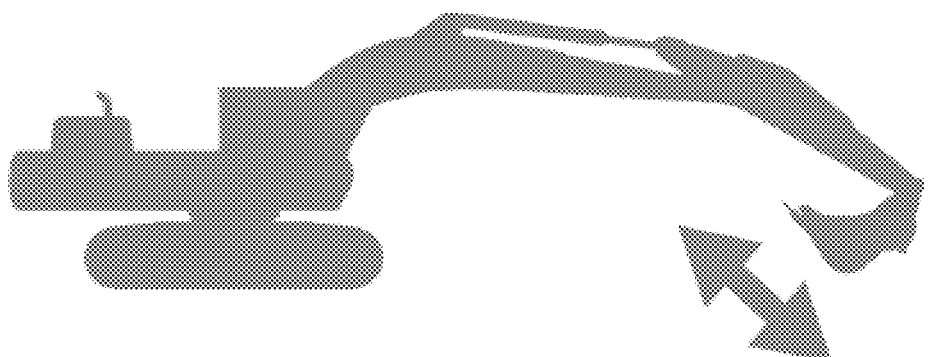
FIGURE 10
*(Prior Art)*

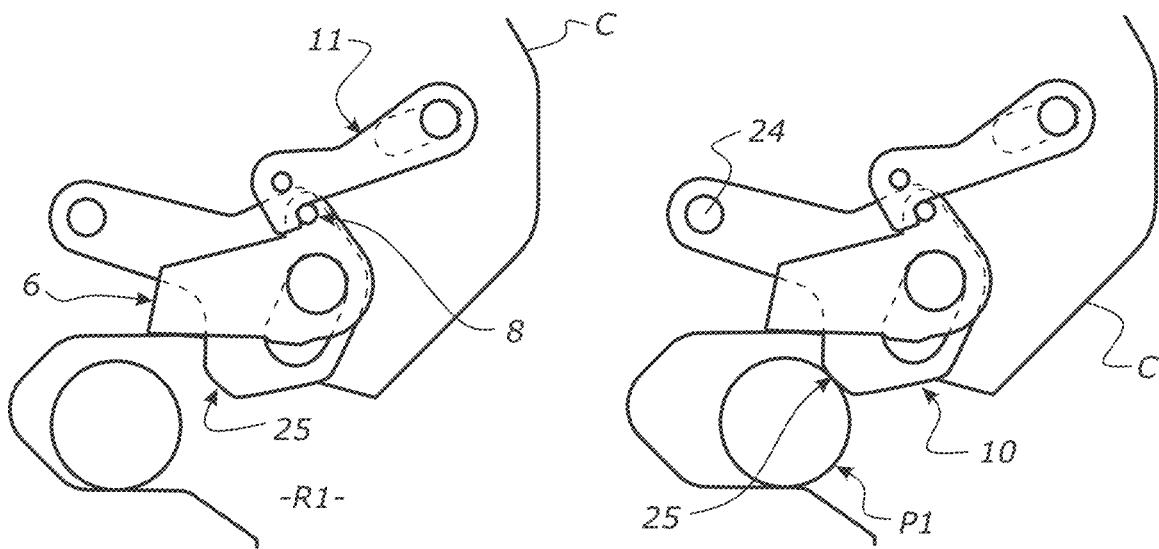
*FIGURE 16*      *FIGURE 17*
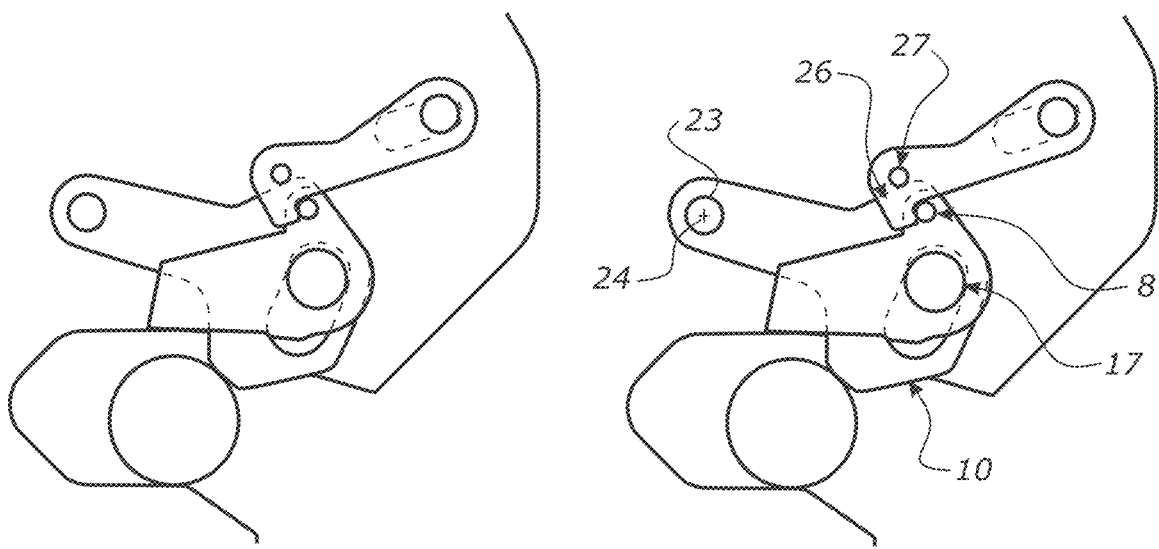
*FIGURE 18*      *FIGURE 19*

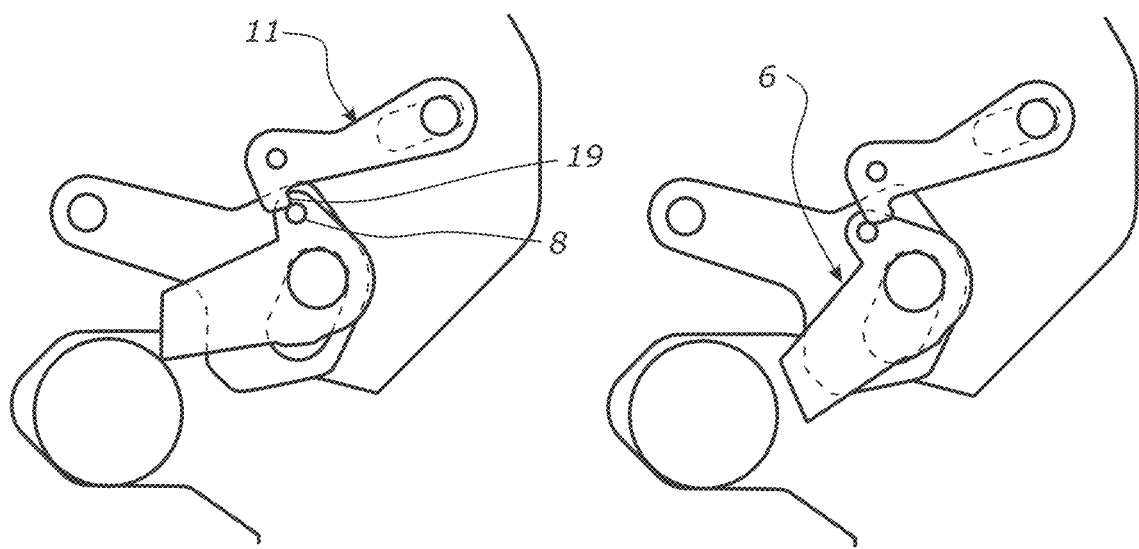
FIGURE 28     FIGURE 29
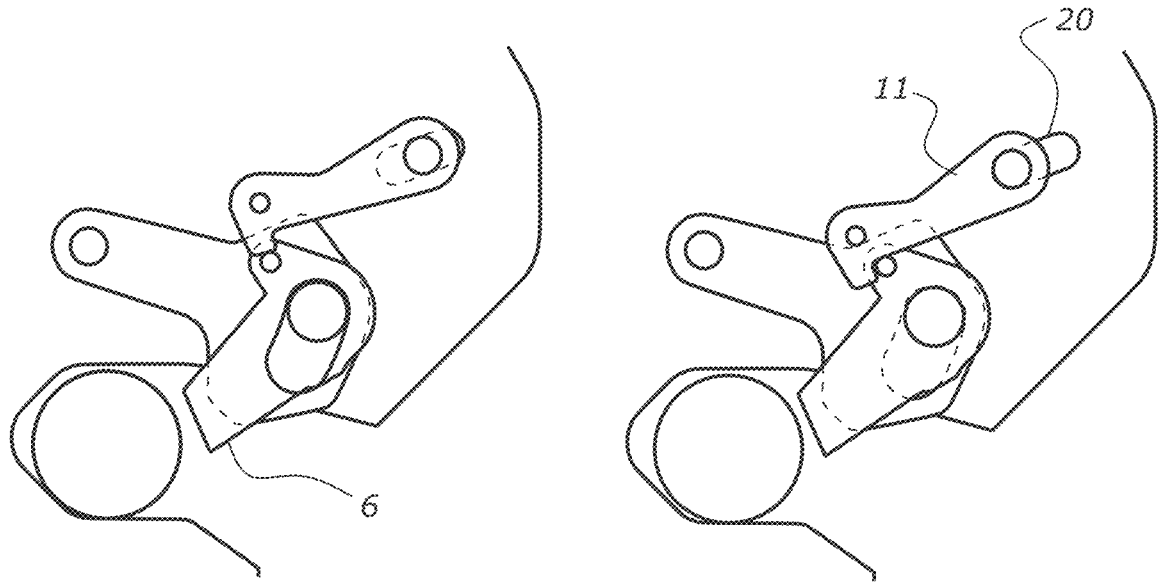
FIGURE 30     FIGURE 31

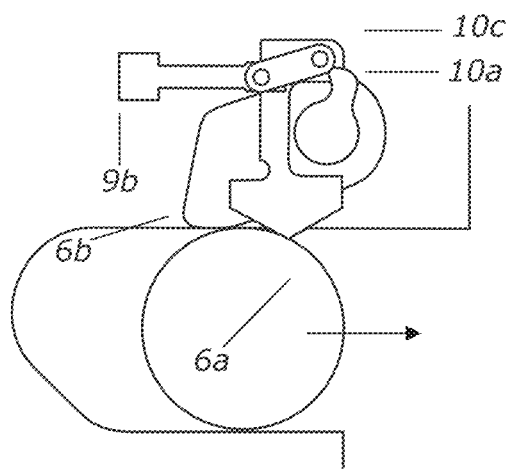
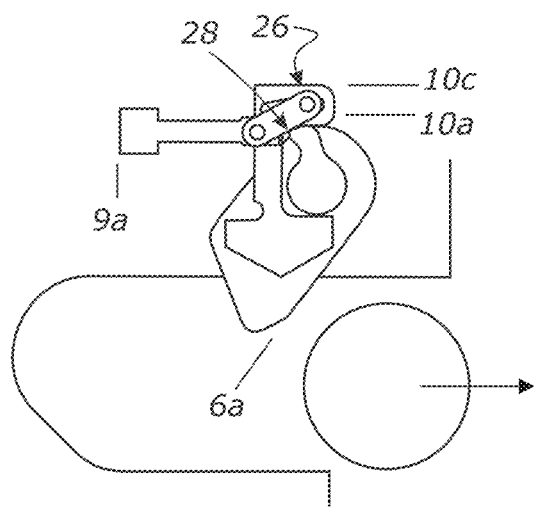
FIGURE 38  FIGURE 39
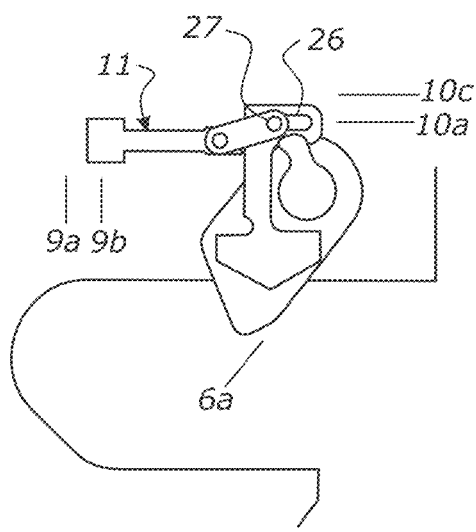
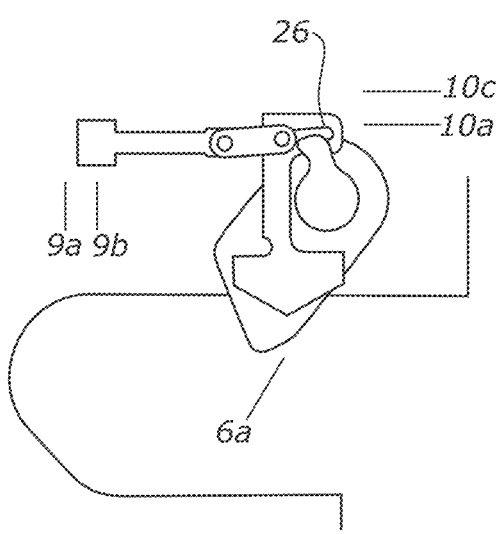
FIGURE 40  FIGURE 41

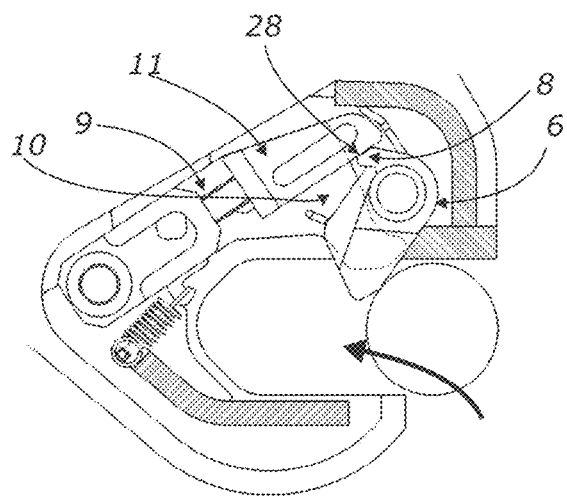
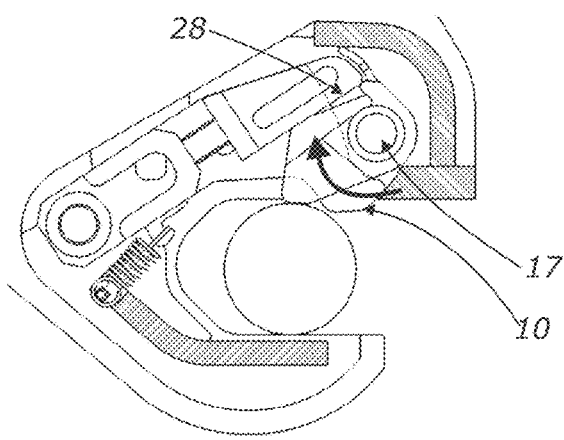
FIGURE 58  FIGURE 59
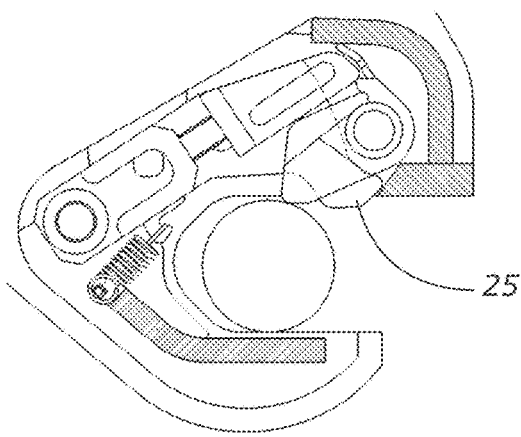
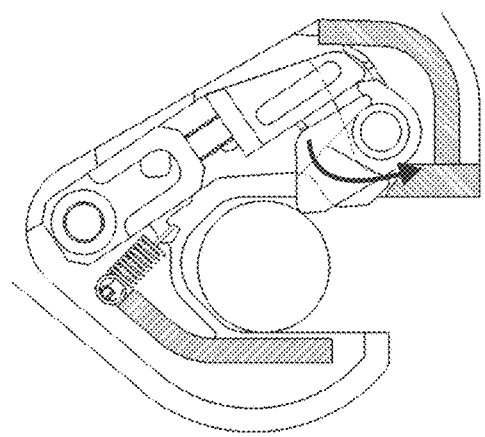
FIGURE 60  FIGURE 61
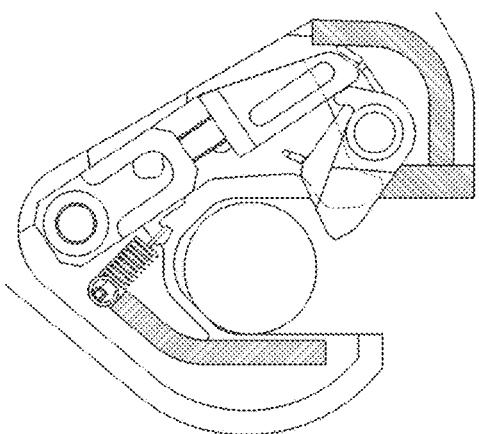
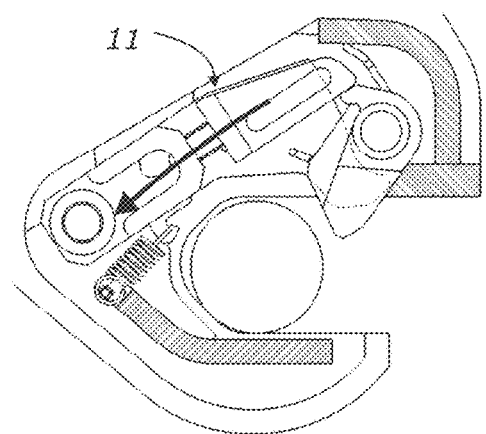
FIGURE 62  FIGURE 63

QUICK COUPLER

CROSS-REFERENCE TO RELATED APPLICATIONS

This application is a continuation application of application Ser. No. 16/488,447 with a filing date of Aug. 23, 2019, which is a national phase application of international application PCT/IB2018/055835 with a filing date of Aug. 3, 2018, which claims priority to New Zealand Application No. 742077 with a filing date of Apr. 30, 2018 and New Zealand Application No. 734332 with a filing date of Aug. 4, 2017, the contents of which are incorporated by reference herein.

BACKGROUND OF THE INVENTION

The present invention relates to a quick coupler for earth working machines. More particularly but not exclusively it relates to a quick coupler having a trigger mechanism to reset a retaining member for an attachment.

Quick couplers are used to quickly engage or disengage an attachment such as for example a bucket to an excavator. The quick coupler may be attached to the end of an excavator arm. A quick coupler may permit the operator of a machine to engage and disengage attachments without them needing to move from the cab or operating position of the excavator. An attachment lying on ground can be connected by the operator by manoeuvring the arm of the excavator to couple with the attachment. No other assistance is needed manoeuvre the attachment to achieve a coupling, hence being "quick" to achieve a coupling.

One type of quick coupler is described in NZ546893 for coupling attachments such as buckets to an excavator. As can be seen NZ546893 and also in FIGS. 1A-B and 2, attachments typically have two parallel pins, P1 and P2, presented in a spaced apart manner and that are each able to be releasable retained at respective receptacles of a quick coupler. A front pin P1 is able to be held nearer to the excavator and a rear pin P2 is held more distal the excavator. Quick couplers need to be able to safely hold their attachments. The attachments can be heavy and carry large loads. An error in establishing a safe coupling can result in a fatal accident or damage occurring. Yet a fast coupling and decoupling of the attachment with a quick coupler is also desired to help increase productivity. There is hence a tension between safe coupling and fast coupling. As seen in FIG. 1, the pin P1 is able to be received at receptacle R1 and pin P2 is able to be received at receptacle R2. At receptacle R1 there is a provided a safety retainer 6, or first retainer 6, that is able to retain the pin P1 at receptacle R1. At receptacle R2 there is provided a wedge 3, or second retainer 3, that is able move to retain the pin P2 at receptacle R2.

Excavators traditionally come supplied with a hydraulic delivery and return line and a hydraulic 4/2 valve for servicing hydraulic components at the end of an arm. Such may be used by a hydraulic ram of the quick coupler to actuate both the retainer 6 and wedge 3 to engage and/or disengage one or both pins. In NZ546893 there are two hydraulic rams used. One for the retainer and one for the wedge.

An example of how an attachment is able to be detached from a quick coupler of a kind as described in NZ546893 is shown in FIGS. 2-6. FIG. 2 shows an excavator 5 with its attachment secured to at the end of the arm 7. The attachment may be placed on a surface such as the ground, to take load off the coupler. FIG. 3 shows the coupler with the pins secure. FIG. 4 shows retraction of both the first retainer 6 and second retainer (or wedge) 3. This may occur by the operator triggering a building of hydraulic pressure on the appropriate hydraulic circuit to actuate the hydraulic rams for each of the retainer 6 and the wedge 3. The two hydraulic rams move the retainer 6 and wedge 3 respectively to a release condition. FIG. 5 shows how an operator can move the coupler away from the attachment so that the pins P1 and pin P2 can egress from the respective receptacle R1 and R2. After a set period of time from the wedge 3 and retainer 6 being in the release condition, a timer system can trigger the actuation of the retainer 6 for it to move to its retaining position as seen in FIG. 6.

FIGS. 7-10 show how an attachment is able to be attached to a quick coupler of a kind as described in NZ546893. FIGS. 7 and 8 show that the wedge 3 is retracted. FIGS. 7 and 8 show the entry of the pin P1 into the receptacle R1 and the retainer 6 being moved to allow entry. The retainer 6 is able to pivot against a spring bias to allow the pin p1 to be received at the receptacle R1. The retainer 6 is spring loaded to move it back to its retaining condition once the pin P1 has moved far enough into the receptacle R1. The retainer 6 will snap into the retaining condition under the influence of the spring once the pin P1 is far enough into the receptacle R1. The snap fit retention means that no operator input is required in order to cause the retainer 6 to move to its retaining condition, during attachment. The pin P1 merely needs to move sufficiently deep into the receptacle R1. FIG. 9 shows that the operator has triggered a build-up of hydraulic pressure to extend the wedge 3 to retain pin P2 at receptacle R2. A quick rattle test is then performed to ensure that the attachment is secured to the coupler.

For safety, the quick coupler of FIGS. 2-10 may have the retainer operation on a timer system. After a set period of time from the release of the retainer 6, to release the pin P1 as seen in FIG. 6, the retainer 6 is reset back to its retaining position. This means that the retainer 6 is reset to a retaining condition where it can retain the pin P1. This may be achieved by electric and hydraulic means to reset the retainer 6 back to the retaining position. A pre-set time is involved between actuating the retainer 6 to move to its release condition before it is able to return back to its retaining condition. This gives the operator enough time to remove the pin P1 from the receptacle R1. An alarm may sound whilst the retainer 6 is raised, so the operator is aware that pin P1 can be removed from the receptacle R1. The time delay may be 10 seconds. This can be too long and time consuming.

Timer utilising quick couplers are able to be damaged by users not familiar with the system. An operator may control the hydraulic ram to release the wedge 3 retaining the second pin P2, and substantially simultaneously releases the retainer 6 retaining the first pin P1, for a set time period. If the operator does not remove the attachment from the quick coupler within the set time period the retainer 6 will reset into a retaining position. As the operator may not realise that the retainer 6 is back in the retaining position and pin P1 is still connected, they may try and remove the attachment, thus damaging the retainer.

The quick coupler of FIGS. 2-10 may use a hydraulic ram to drive the wedge 3 and a separate hydraulic ram to retract the retainer 6. This means that a traditional 4/2 valve is not sufficient to control both hydraulic rams and retain the timeout function. A non-OEM hydraulic valve is required to be retrofitted to the excavator to allow both rams to be operated or an additional pair of hydraulic lines could be run. This adds expense.

Known quick couplers may also require an attachment to be fully crowded towards the excavator to allow removal of the attachment. This may be troublesome for some attachments where the centre of gravity is quite remote from the quick coupler attachment region, for example for breaker bars. Breaker bars may also be stored vertically in a cradle for transportation. Problems may occur when the breaker bar is crowded towards the excavator for disengagement, and is then required to be loaded into a vertical cradle position. Handling of the disengaged, or partially disengaged attachment can be unsafe.

SUMMARY OF THE INVENTION

It is therefore a preferred object of the present invention to provide a coupler and/or an earth working machine that includes a coupler that overcomes at least one of more of the disadvantages mentioned above and/or to provide the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

For the purpose of this specification, where method steps are described in sequence, the sequence does not necessarily mean that the steps are to be chronologically ordered in that sequence, unless there is no other logical manner of interpreting the sequence.

Accordingly in a first aspect the present invention may be said to be a coupler for securing an attachment to an earth working machine, the coupler comprising a coupler body that comprises a receptacle comprising a mouth opening via which a pin of the attachment can pass to move through a passage of the receptacle to a captive region of the receptacle, the passage of the receptacle able to be occluded sufficient to prevent the pin from moving out of the captive region by a retainer movably presented from and relative to the coupler body, the retainer being biased to a passage occluded first position at which the retainer prevents the pin from moving out of the captive region and being movable to a second position relative the passage, thereby allowing:
  (i) ingress of said pin into the captive region by forcing said pin against the retainer to move the retainer against the retainer's bias towards said second position; and
  (ii) egress of said pin from the captive region, by a driver movably presented from and relative to the coupler body and able to be moved relative the coupler body to be (a) coupled with the retainer, to allow the retainer to be moved by the driver to the retainer's second position and (b) decoupled from the retainer, preventing the driver from controlling the retainer's movement between the retainer's first and second positions,
  wherein the coupler further comprises a trigger that is movable relative the coupler body in a manner to be engaged and able to be moved by said pin as the pin moves through the passage in a manner so that the trigger can, when so moved by said pin, cause the driver to decouple from the retainer.

Preferably the trigger can cause a coupled retainer and driver to decouple so that the retainer, if not in its first position, is able to move to its first position under influence of the bias.

Preferably the trigger can cause a coupled retainer and driver to move relative each other to decouple so that the retainer is not held from moving to its first position by the driver.

Preferably driver is mounted relative the coupler body to move in a rotational manner for moving between its coupled and decoupled condition.

Preferably trigger is mounted relative the coupler body to move in a rotational manner.

Preferably the driver is mounted to move in a rotational manner relative the coupler body for moving between a coupled and decoupled condition and the trigger is mounted to move in a rotational manner relative the coupler body, each of the driver and trigger about a common rotational axis.

Preferably the coupler body is able to be secured or is attached to the earth working machine.

Preferably the driver is located by the coupler body and can be actuated to move relative to the coupler body to move the retainer to its second position when coupled with said retainer.

Preferably the retainer is mounted relative to the coupler body and able to move relative the coupler body in rotational manner.

Preferably the retainer is able to rotate about a rotational axis fixed relative the coupler body.

Preferably the retainer is mounted by a retainer axle to the coupler body.

Preferably the retainer is able to move between its first position where it is positioned relative the coupler body and relative the receptacle sufficiently to occlude the passage of the pin out of the captive region and its second position where passage of the pin out of the captive region is not occluded by the retainer.

Preferably the driver is able to move between a first position and a second position relative the coupler body, it's said first position corresponding, when coupled to said retainer, to the first position of the retainer and its second position corresponding, when coupled to said retainer, to the second position of the retainer.

Preferably the movement of the driver between its first and second positions is rectilinear save for any rotational movement induced by the coupling of the driver with the retainer as the retainer rotates between its first and second positions.

Preferably the retainer is able to move between its first position where it projects from the coupler body at least partially across the receptacle sufficiently to occlude the passage of the pin out of the captive region and its second position where passage of the pin out of the capture is not occluded by the retainer.

Preferably the retainer is able to move between its first position where it extends from the coupler body across the receptacle and its second position where the retainer does not extend across the receptacle.

Preferably the retainer extends across the receptacle more when in its first position than when in its second position.

Preferably the retainer is prevented from moving away from the second position, when in the first position.

Preferably the coupler body includes a stop to stop the movement of the retainer past its first position.

Preferably the stop comprises a stop surface against which the retainer is biased when in its first position.

Preferably the retainer is biased by a spring.

Preferably the spring is a torsional spring.

Preferably the spring acts directly on the retainer or indirectly on the retainer such as on the shaft by which the retainer is mounted to the coupler body.

Preferable the first position of the retainer places the retainer more proximate the mouth of the receptacle than the second position which places the retainer more proximate or in the captive region.

Preferably the retainer axis is substantially parallel the elongate direction of the pin, when the pin is retained at said receptacle.

Preferably the retainer in said first position prevents the egress of said pin from said captive region when said pin is retained in the receptacle and allows the ingress of said pin into the captive region past the retainer when said pin passes through the mouth and passage into the receptacle.

Preferably the driver and the retainer (or the shaft by which the retainer is mounted to the coupler body) have mutually co-operable coupling surfaces or members acting as a coupling, operatively engaged together when said drivers is in its coupled condition and operatively disengaged when the driver is in its decoupled condition.

Preferably the retainer and driver have mutually co-operable coupling surfaces or members acting as a coupling, connected when said drivers is in its coupled condition and disconnected when the driver is in its decoupled condition.

Preferably the coupling is located radially away from the retainer axis.

Preferably the retainer and driver are captured or indexed or hooked or geared together when coupled and are disconnected or unhooked when decoupled.

Preferably the retainer and driver are hooked together when coupled, at a location that is radially outward from the retainer pivot.

Preferably the coupling surface or member of the retainer is able to be in sliding contact with the driver when the driver is in the decoupled condition and retain the driver in its decoupled condition until the driver is moved to it first position and the retainer is in its first position.

Preferably the coupling comprises a retainer lug of the retainer and a coupling surface of the driver able to couple with the retainer lug to couple the retainer and the driver.

Preferably the retainer lug is located radially away from the retainer axis to allow, when coupled, the driver to apply a rotational torque to the retainer in a direction and move the retainer towards its second position.

Preferably the driver is mounted directly or indirectly to the coupler body in a manner to be able to move rectilinearly relative the coupler body.

Preferably the driver is mounted directly or indirectly to said body to be able to move rotationally relative said coupler body.

Preferably the driver is mounted directly to said coupler body.

Preferably the driver and the trigger are mounted together to the coupler body.

Preferably the driver and trigger are mounted together to the coupler body to be able to move in concert rotationally relative the coupler body.

Preferably the driver and trigger are mounted together to the body to be able to move in concert rotationally relative the body and the driver is able to move at least one of rotationally and rectilinearly relative to the trigger.

Preferably the driver and trigger are mounted together to the body to be able to move in concert rotationally relative the coupler body and the driver is able to move rectilinearly relative to the trigger.

Preferably the driver is coupled to a driver actuator to cause the driver to move in a manner able to move the retainer.

Preferably the driver actuator is located by the coupler body.

Preferably the driver actuator and the trigger are mounted together and to the coupler body, the driver actuator able to cause the driver to move in a rectilinear manner relative the trigger.

Preferably the driver actuator is mounted to move about the trigger rotational axis and able to move the driver in a direction radial to the trigger rotational axis.

Preferably the driver actuator is a hydraulic driver actuator.

Preferably the driver actuator is hydraulic and, when actuated, is able to cause the driver to move in a direction to, when the driver is coupled to the retainer, move the retainer to or towards its second position.

Preferably the driver actuator, when de-actuated, will allow the driver to move in a direction to, when coupled to the retainer, allow the retainer to move towards its first position.

Preferably the bias acting on the retainer is sufficiently strong that when the driver actuator is de-actuated, and the driver is coupled to the retainer, the bias can move the retainer towards its first position.

Preferably a bias acts directly or indirectly on said driver to urge the driver to move to a position capable of assuming a coupled condition.

Preferably said bias is provided by a spring acting on the driver directly or indirectly.

Preferably the bias urges the driver to rotate relative the coupler body.

Preferably the receptacle is provided by the coupler body.

Preferable the receptacle is provided into the coupler body.

Preferably a second receptacle is provided by the coupler body at a location away from said first mentioned receptacle, said second receptacle provided to receive and retain a second pin of the attachment.

Preferably said second receptacle is provided and can retain a second pin of the attachment when said first receptacle is retaining said first pin, and/or said second receptacle can retain a second pin of the attachment when said first receptacle has no said first pin thereat, and a second retainer is provided, located by the coupler body in a manner to move between a first position where it prevents a second pin located in the second receptacle from moving out of the second receptacle, and a second position where the retained second pin can be released from the second receptacle.

Preferably the second retainer is actuated for movement by a hydraulic actuator.

Preferably the hydraulic actuator for the second retainer is different to the hydraulic actuator for the driver.

Preferably the hydraulic actuator for the second retainer is on the same hydraulic circuit as the hydraulic actuator for the driver.

Preferably actuation of the hydraulic actuator for the second retainer actuates the hydraulic actuator for the driver.

Preferably de-actuation of the hydraulic actuator for the second retainer de-actuates the hydraulic driver actuator.

Preferably when deactivated, the bias acting on the driver causes the driver to move to a position corresponding to one where it can couple with the retainer when the retainer is in its first position.

Preferably the actuation of the driver may be a mechanical actuator.

Preferably the mechanical actuator is a screw and thread type system.

Preferably the trigger is mounted by the coupler body for be able to rotational move relative the coupler body.

Preferably the trigger is mounted to said coupler body for rectilinear movement relative the coupler body.

Preferably the trigger includes a trigger region presented for contact by the pin as the pin enters or leaves the captive region of the first mentioned receptacle.

Preferably the trigger includes a trip region that, upon movement (preferably rotation) of the trigger relative the coupler body caused by the pin moving into or out of the captive region, contacts and/or moves the driver in a manner to move the driver (preferably to rotate the driver) sufficiently relative the retainer to decouple the driver and retainer.

Preferably the driver rotates for coupling and decoupling with the retainer, and is driven in a translational manner for moving the retainer between its first position and second position when coupled with the retainer.

Preferably the trip region is a surface of the trigger able to contact a surface of the driver.

Preferably the trigger is biased to a rotational position relative the coupler body where the trigger is presented for contact by a pin as it moves into and/or out of the captive region.

Preferably the rotational bias of the trigger is provided by a spring.

Preferably when the trigger causes a decoupling between the driver and retainer, the retainer is able to rotate to its first position under the force of the bias without the driver also rotating with the retainer.

Preferably the coupler is engaged to the end of an arm of an earth working machine.

Preferably a hydraulic pump for the hydraulic actuator(s) is carried by the earth working machine.

Preferably the coupler body includes attachments to allow the coupler to be secured to the arm of an earth working machine.

Preferably the coupler body comprises of two spaced apart connected plates each including a rebate from an edge thereof to together define the receptacle.

Preferable the retainer is located between the two primary plates of the coupler body.

Preferable the trigger is located between the two primary plates of the coupler body.

Preferable the driver is located between the two primary plates of the coupler body.

Preferable the driver actuator is located between the two primary plates of the coupler body.

Preferable the a pair of retainers movable in concert, are located between the two primary plates of the coupler body, one adjacent each primary plate.

Preferable the a pair of triggers, movable in concert are located between the two primary plates of the coupler body, one adjacent each primary plate.

Preferably the retainer moves to its first position under the retainer bias when then trigger causes the driver and the retainer to decouple.

Preferably the trigger is biased to move, to extend at least partially across the receptacle.

Preferably the second retainer may be in a position to allow a second pin to be released from the second receptacle, whilst the first retainer is in its first position.

Preferably the second retainer may be in a position to allow a second pin to be released from the second receptacle, whilst the first retainer is in its first position and is decoupled from the driver.

Preferably the coupler body defines the receptacle.

Preferably the coupler body includes two primary plates, parallel each other and each including an edge profile to define said receptacle.

In a second aspect the present invention may be said to be a coupler for releasably coupling an attachment that includes a coupling pin, to an earth working machine, the coupler comprising,
  a. a coupler body secured or able to be secured to the earth working machine,
  b. a receptacle presented by the coupler body adapted to receive said pin
  c. a retainer presented by the coupler body in a movable manner relative to the coupler body to, in a pin retaining position relative the coupler body, retain the pin in the receptacle, the retainer coupleable and de-coupleable with a driver that, when coupled to the retainer, can move the retainer from the pin retaining position to a position where the pin can egress the receptacle,
  d. a trigger that is able to be contacted by said pin as the pin moves relative to the coupler body to enter and leave the receptacle to cause the retainer and the actuator to decouple.

Preferably the trigger is configured to cause the retainer and the actuator to decouple at least when the retainer is not in the pin retaining position to allow the retainer to be moved under the influence of a biasing force to its pin retaining position.

In a further aspect the present invention may be said to be an earth working machine that comprises a chassis and an arm supported by the chassis, the coupler as herein before descried being supported at the end of the arm.

In still a further aspect the present invention may be said to be a coupler for releasably coupling an attachment that includes a coupling pin to an earth working machine, the coupler comprising,
  a. a coupler body,
  b. a receptacle presented by the coupler body to receive said pin via a mouth of the receptacle,
  c. a retainer located by the coupler body in a manner able to move relative the receptacle between a first position to retain said pin in the receptacle and a second position to allow the release of said pin from the receptacle, the retainer able to move, against a bias urging the retainer towards the first position, to or towards the second position by each of:
    i. the pin when the pin moves via the mouth into the receptacle to allow the pin to move into the receptacle to be retained thereat by said retainer, and
    ii. a retainer coupled driver located by the coupler body and that can be actuated to move relative to the coupler body, and
  d. a trigger located by the coupler body and presented relative the receptacle to be contacted by said pin and be moved by said pin relative the coupler body when said pin moves in at least one (and preferably each) of (i) a direction to move into the receptacle, and (ii) a direction to move out of the receptacle, to cause a coupled retainer and driver to move to decouple so that the retainer, if not in its first position, is able to move to its first position by the bias.

Preferably the chassis supports an hydraulic motor that can provide hydraulic pressure to said actuator(s) of said coupler.

Preferably a hydraulic circuit is provided, that includes at least one hydraulic valve that controls hydraulic pressure to said actuator(s).

Preferably said chassis supports a cab for an operator of said earth working machine to be located at to control said earth working machine.

Preferably said hydraulic valve can be controlled from said cab by an operator.

In a further aspect the present invention may be said to be a coupler for securing an attachment, that includes a mounting pin, to an earth working machine, the coupler comprises a coupler body that presents a receptacle having a captive region to receive the mounting pin and a retainer can capture the pin in the captive region, the retainer able to be moved by a driven driver to a position to allow release of the pin from the captive region and a trigger that the pin will strike when the pin moves into or out of the captive region that then moves to decouple the driver from the retainer and the retainer is then allowed to be biased back to its retaining position by a spring.

In a further aspect the present invention is said to be a coupler for securing an attachment, that includes a mounting pin, to an earth working machine, the coupler comprises a coupler body that presents a receptacle having a captive region to receive the mounting pin and a retainer to capture the pin in the captive region when in a retaining position relative to the coupler body, the retainer able to be moved relative to the coupler body by a driven driver to a position to allow release of the pin from the captive region and a trigger presented from said coupler body in a manner that the pin will strike the trigger when the pin moves into and out of the captive region that then moves to decouple the driver from the retainer and the retainer is then not constrained by the driver to move back to its retaining position.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification [and claims] means "consisting at least in part of". When interpreting statements in this specification [and claims] which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.)

BRIEF DESCRIPTION OF THE DRAWINGS

The invention will now be described by way of example only and with reference to the drawings in which:

FIGS. 7-10: show a side schematic view of a coupler of the prior art engaging with pins of an attachment.

FIGS. 12-22: show detailed side schematic views of a pin of an attachment egressing for retention by the retaining system.

FIGS. 24-31: show detailed side schematic views of a pin of an attachment entering a retaining system after a pin has egressed, such as following on from FIG. 22 (first engagement mode).

FIGS. 32-41: show detailed side schematic views of a pin of an attachment leaving an alternative (second version) embodiment retaining system.

FIGS. 58-66: show detailed side schematic views of a pin of an attachment entering a third version retaining system in first engagement mode.

With reference to the above drawings, in which similar features are generally indicated by similar numerals, a retaining system 1 according to a first aspect of the invention is shown.

DETAILED DESCRIPTION

Figure 1A:
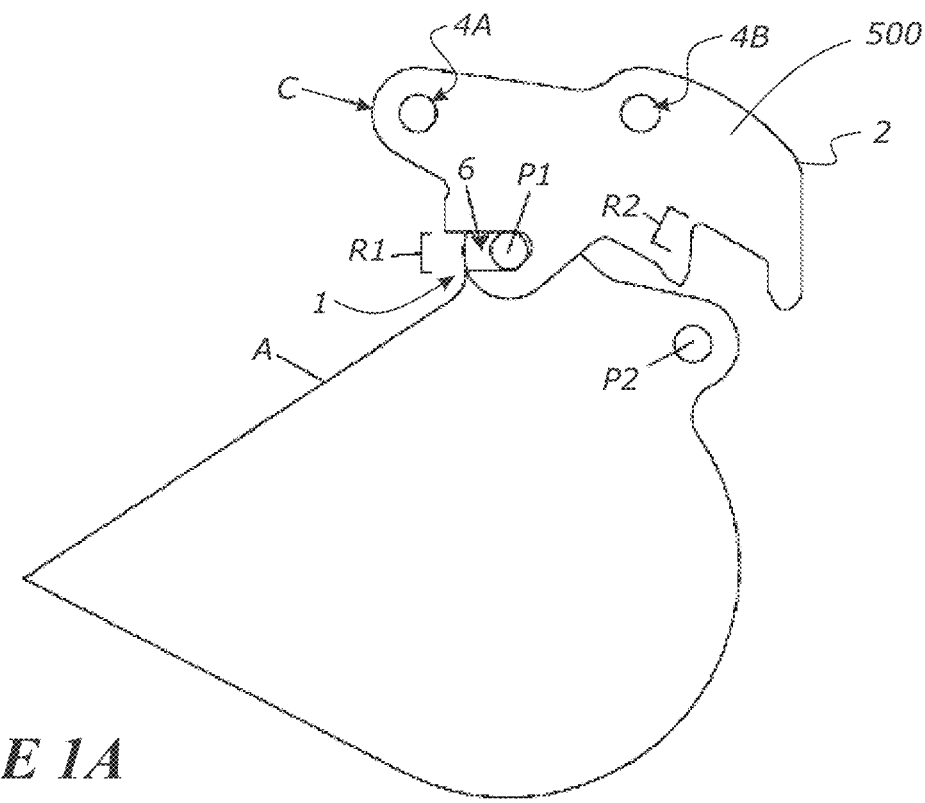
FIG. 1A: shows a side view of an attachment, such as a bucket, partially engaged with a coupler.
Figure 1B:
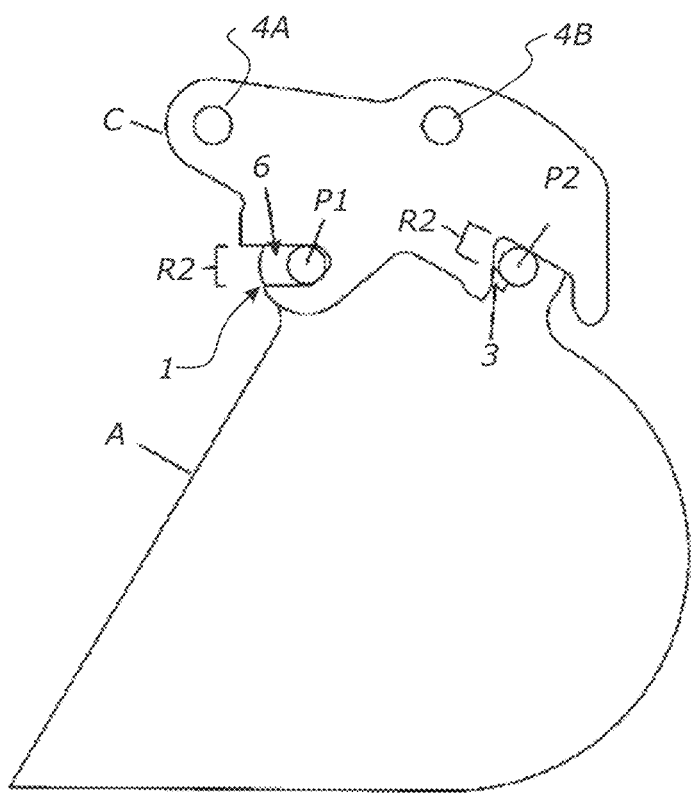
FIG. 1B: shows a side view of a bucket fully coupled to a coupler.
Figure 2:
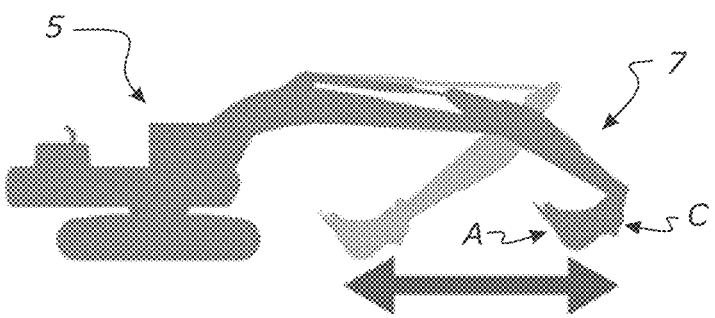
FIG. 2-6: show a side schematic view of a coupler of the prior art disengaging with the pins of an attachment.
Figure 3:
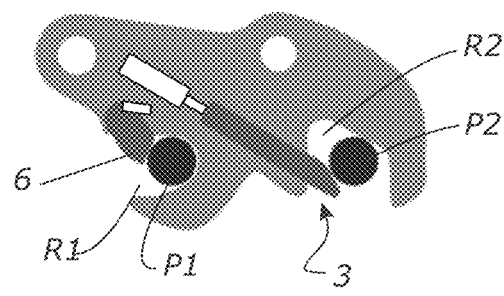
Figure 4:
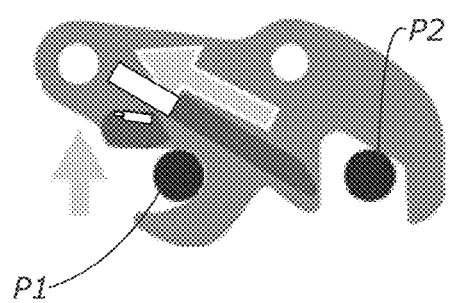
Figure 5:
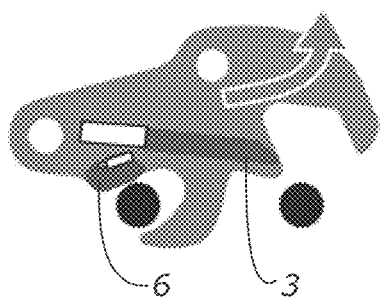
Figure 6:
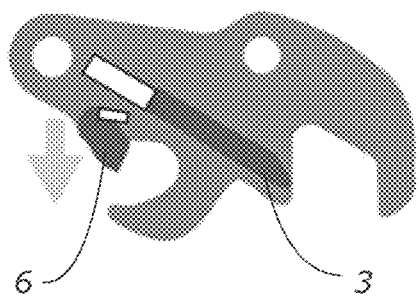
Figure 52:
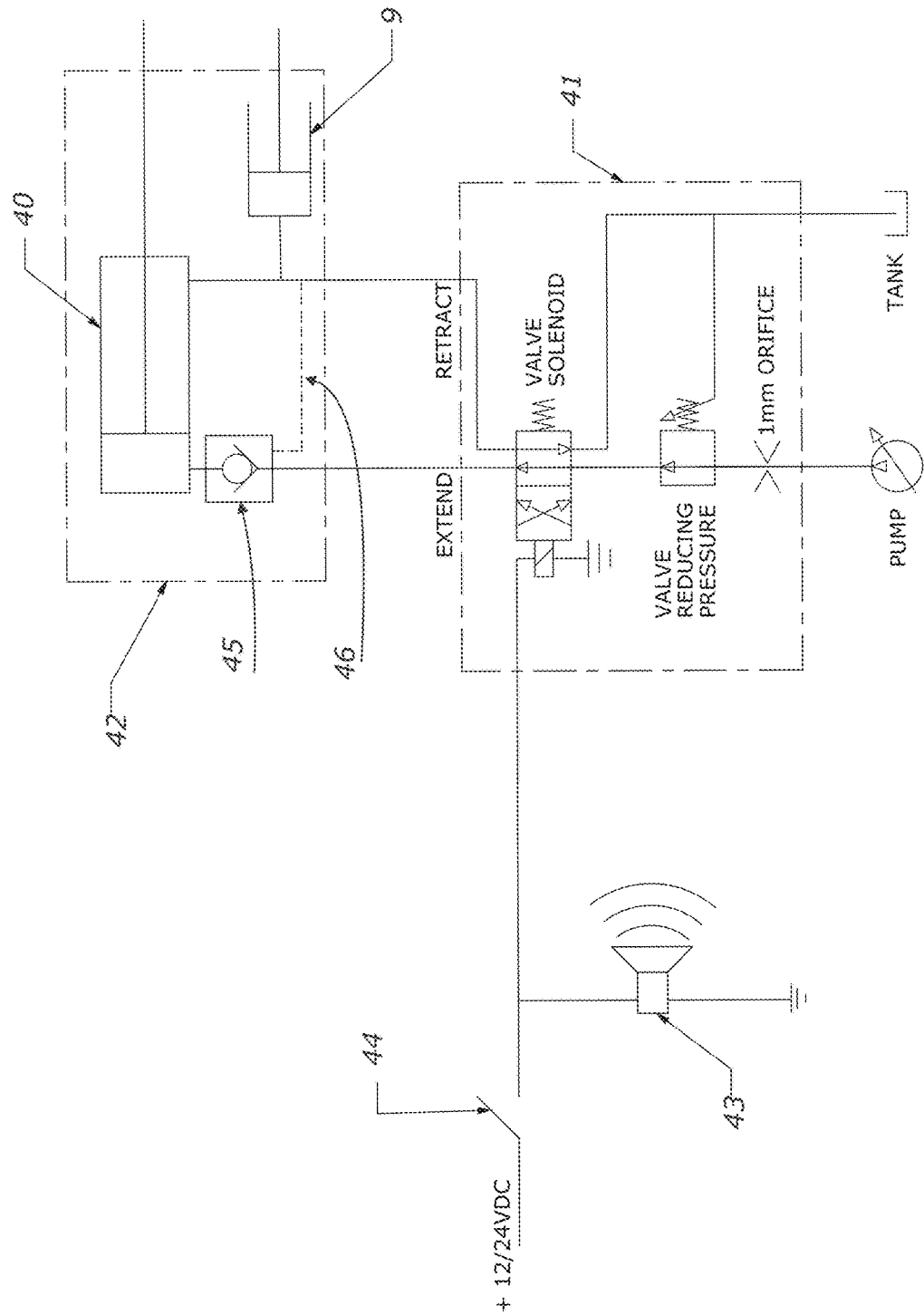
FIG. 52: shows a schematic of a hydraulic system.

With reference to FIGS. 1A and 1B there is shown a quick coupler C. The quick coupler may comprise of a body 2 that may include a plurality of mounting points 4A and 4B for securing the quick coupler to the end of an arm 7 of for example an excavator 5 (as shown in FIG. 2). The quick coupler is able to be attached and detached to an attachment A. In the example shown in FIGS. 1A and 1B, the attachment may be an excavator bucket. The attachment A presents two parallel spaced apart pins P1 and P2 which are able to be securely received at spaced apart receptacles R1 and R2 of the coupler C, respectively. For retaining the pin P1 at receptacle R1, a retaining system 1 comprising a first retainer 6 (which may herein be referred to simply as retainer 6) is used. For retaining the pin P2 at receptacle R2, a second retainer 3 is used. The second retainer 3 may for example be retainer that is able to be moved between a retracted and an extended condition by way of a hydraulic ram 40 as shown in FIG. 52. The second retainer 3 may be, or includes, a wedge shape and may be a bar or plate or rod or similar. At the first receptacle R1 there is provided a retaining system 1. The location of the retaining system 1 and the second retainer 3 could be swapped around in some embodiments.

The body 2 of the quick coupler C may comprise of two primary plates. In FIG. 1A a primary plate 500 is shown. The second primary plate is spaced apart from the first primary plate and connected to the first primary plate preferably in a parallel condition. The primary plates and/or other parts of the body preferably define the receptacle R1. The plates may include suitably shaped edge profiles for such purposes. At receptacle R1 the pin P1 (the front pin for example of the attachment A) is able to be received. The pin P1 and also the pin P2 when engaged to the body extend through and project from the lateral sides of the primary plates. For ease of illustration, the depth of the coupler is not shown in most of the Figures and instead a side view looking onto a primary plate is shown in most Figures.

In its fully retained condition as shown in FIGS. 1A and 1B, the retaining system is able to retain the pin P1, securely in the captive region CR of receptacle R1 without the pin P1 being able to be removed from the receptacle R1 through the mouth of the receptacle.

Figure 11:
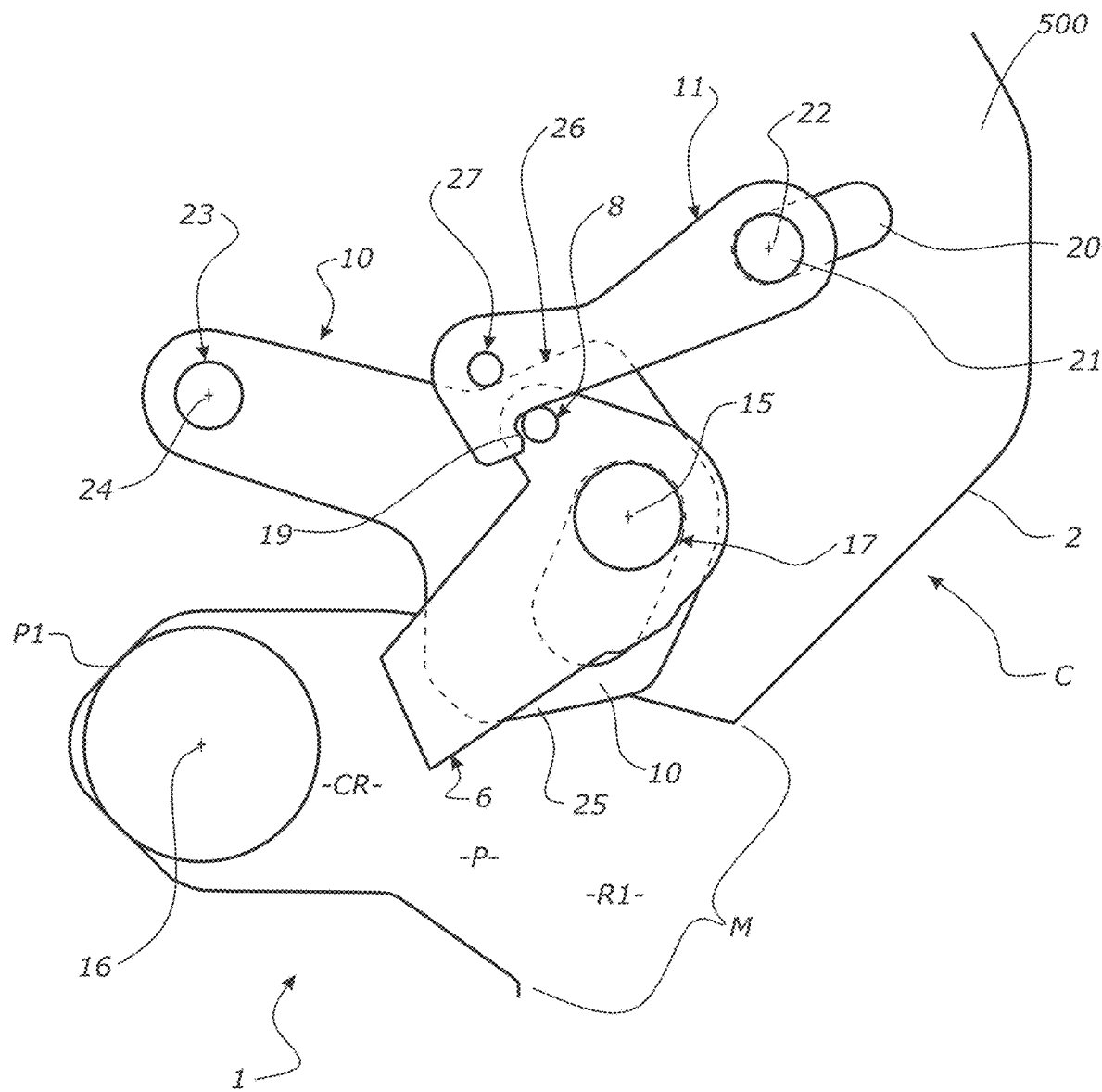
FIG. 11: shows an enlarged side schematic view of a retaining system.
Figure 23:
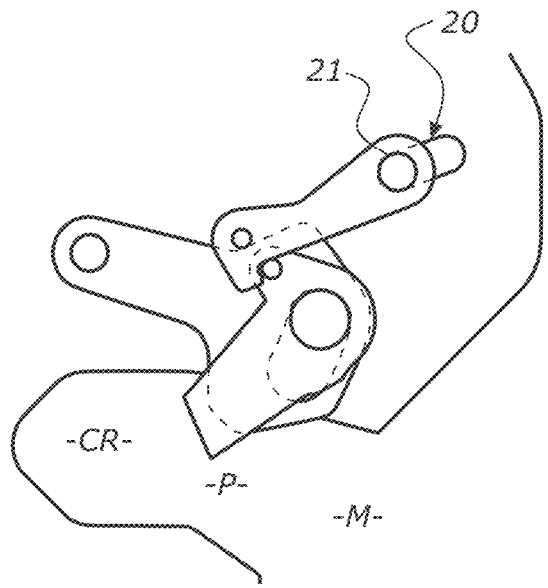
FIG. 23: shows a detailed side schematic view of the retaining system having been reset to 'lift mode' after pin egress.

With reference to FIG. 11 there is shown part of the body 2 of the coupler C at the receptacle R1. The receptacle R1 has a mouth opening M that is sufficiently large to allow for the pin P1 to pass therethrough and into the receptacle R1. The receptacle R1 may comprise a captive region CR where a pin P1 is able to be seat and be held captive at by the retainer 6. The seating at the captive region may be loose or slack. Intermediate the captive region CR and the mouth M, is a passage P—as shown in FIG. 23. A pin can pass to move through said passage P of receptacle R1 to the captive region CR of the receptacle R1. The passage P of the receptacle R1 is able to be occluded to prevent the pin from moving out of the captive region CR by the (first) retainer 6 that is biased to a position that occludes passage of a pin at the captive region through the passage P. In one embodiment, as seen in side view in FIG. 11, able to project from one side of the passage, at least partially across the receptacle R1, is the retainer 6. The retainer is preferably made of steel. The retainer 6 in its retaining condition also herein referred to as its first position, as shown in FIG. 11, projects sufficiently far across the receptacle R1 to prevent the pin P1 from being removed from the captive region. The retainer 6, in the preferred embodiment, is rotationally mounted relative to the body 2 (e.g. relative to and preferably mounted by the primary plates) about a retainer axis 15. The retainer axis 15 is preferably parallel to the elongate pin axis 16 of the front pin P1 when engaged.

In the alternative, the retainer 6 may be mounted to the body for linear movement.

Figure 49:
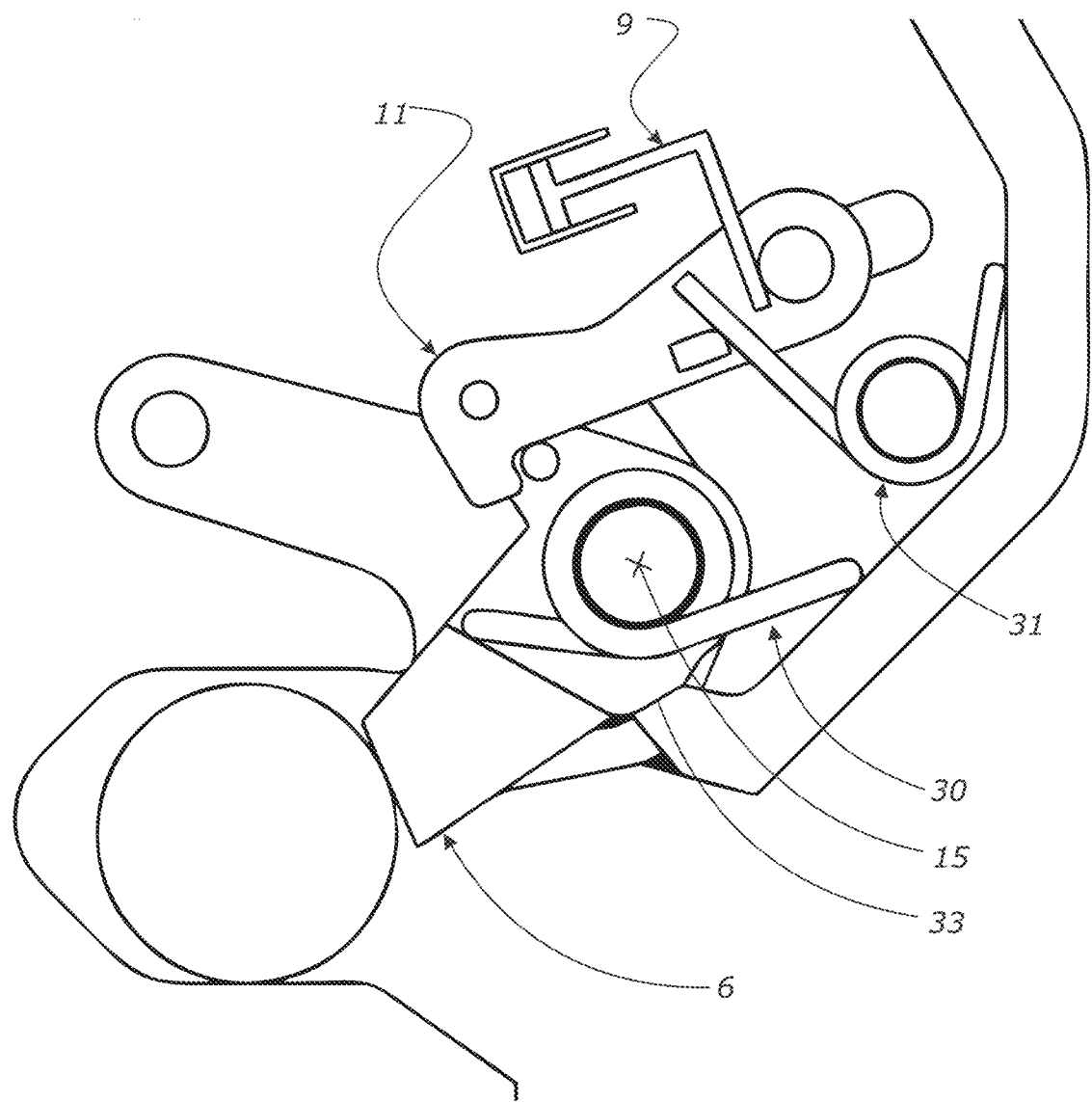
FIG. 49: shows a side detail view of a retaining system of the present invention with the spring bias's and rotation stops detailed

The retainer 6 is preferably mounted to the body 2 on a retainer shaft 17 to allow for the retainer 6 to rotate on its retainer axis 15. The retainer shaft may be secured at its ends to the primary plates of the body. The retainer 6 is able to pivot on its retainer axis 15 from its retaining first position, as shown in FIG. 11, in a clockwise direction. This may occur when the pin P1 is being inserted into the receptacle R1 by the pin pushing the retainer towards its second position away from its first position, or by a driver as will herein after be described. A rotation stop 33 may be provided to prevent the retainer 6 from rotating in an anti-clockwise direction from its retaining position as shown in FIG. 11. For clarity the rotation stop 33 has not been shown in FIG. 11 but is shown in FIG. 49. It will be appreciated that many alternative forms of rotation stops may be provided to prevent over rotation of the retainer 6.

The retainer 6 is able to be moved from its pin retaining position, as shown in FIG. 11, to a pin release position as shown in FIG. 16. This may be achieved by the use of a driver 11. The driver 11 is able to be coupled to the retainer 6. This may be achieved using the retainer lug 8 of the retainer. The retainer lug may be a pin or may be a surface of the retainer 6 or provided to the retainer 6 that is configured and adapted to allow the driver 11 to couple therewith. The driver 11 is able to be moved from a first position as shown in FIG. 11 to a second position as shown in FIG. 16. The driver 11 may be moved by a driver actuator 9. It will be appreciated that the driver actuator 9 may take the form of, for example, a mechanical or hydraulic ram 9. However, it will more often take the form of a hydraulic ram 9, to cooperate appropriately with the hydraulic configurations typically employed on excavators of the art.

It will be appreciated that reference to hydraulic ram 9 herein shall not exclude instances where the driver actuator 9 takes a mechanical or otherwise non-hydraulic form i.e., the terms driver actuator 9 and hydraulic ram 9 may be used interchangeably.

The movement of the driver 11 to its second position can cause the retainer 6 to rotate from its pin retaining position to its releasing position when the driver and retainer are coupled. The retainer lug 8 is positioned at a distance from the retainer axis 15 of the retainer 6 to allow for a rotational force to be applied to the retainer 6 by the driver 11 as it moves to the second position. The driver 11 may comprise of a coupling region 19 that is able to hook and/or otherwise releasably couple with the retainer lug 8. In order to allow for the pin P1 to be released from the receptacle R1, the driver 11 when coupled with the retainer is able to be moved from its first position as shown in FIG. 11 to its second position as shown in FIG. 16 to at least partially, if not completely, remove the retainer 6 from extending across the receptacle R1.

A noteworthy feature in some modes and/or embodiments is that the retainer 6 is able to completely egress the receptacle R1 such that there is not able to be any interference of the pin with the retainer 6 when the retainer is in its second position as shown in FIGS. 16, 33, 46 and 73. If the retainer 6 was susceptible to interference with the pin P1, then the pin P1 may push the retainer past a point to where the retainer lug 8 may de-couple with the coupling region 19. This full rotation of the retainer 6 so that it is held outside the receptacle in its second position, or at least helps prevents accidental de-coupling.

In the position as shown in FIG. 16 the pin P1 is able to egress from the receptacle R1 without interference from the retainer 6. Where reference is made to extending into or egressing from the receptacle, it will be appreciated that this is taken from a reference frame looking onto the primary plate 500 of the body/housing as seen in FIG. 11 for example. The retainer is located adjacent the first primary plate 500 and likewise a corresponding retainer may be provided adjacent the second primary plate (not shown) and other related retention system components may likewise be provided at the other side of the body of the quick coupler.

Figure 22:
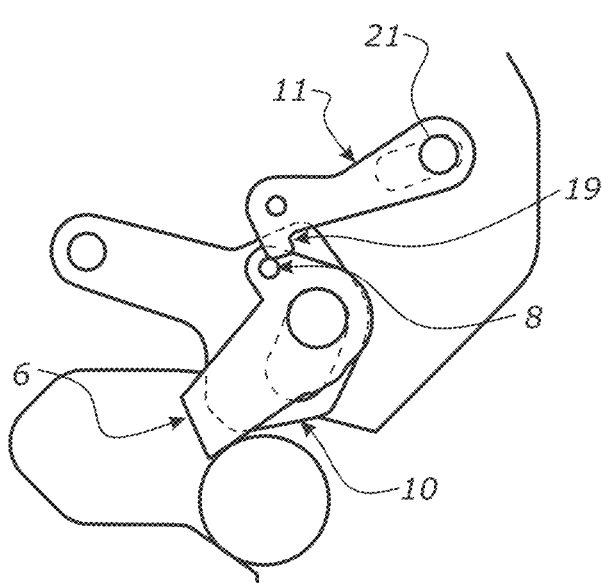

The driver 11 may be guided for movement (the movement preferably caused by the driver actuator 9) along a path by a track or slot 20 of the housing along which an axle 21 of the driver 11 is mounted. The axle 21 is able to slide within the slot 20 for translational movement there along. The driver 11 is preferably mounted to rotate on a driver axis 22. Such rotation allows for the driver 11 to move between a coupled condition as shown in FIG. 11 coupling the driver 11 with the retainer 6 at the retainer lug 8 and coupling region 19 and a decoupled condition as shown in FIG. 22 where the coupling region 19 and the retainer lug 8 are decoupled from each other. The slot 20 and axle 21 allows for such rotation to occur in the example shown in FIGS. 11 and 22.

In addition the retaining system 1 comprises a trigger 10. The trigger 10 is preferably rotationally mounted to the body 2 by a trigger axle 23 to allow for the trigger 10 to rotate on a trigger axis 24. The trigger 10 is presented so that a trigger region 25 of the trigger projects or is able to project at least partially across the receptacle R1. Preferably the trigger 10, and as such the trigger region 25, projects at least partially across the passage P to be presented for contact with a pin moving through the passage. As such the trigger region 25 is contacted by the pin P1 as the pin P1 passes the trigger 10 and is thereby able to be moved in a rotational manner on its trigger axis 24. The trigger may be mounted for linear movement instead relative the body 2 (as shown in alternative embodiment FIGS. 32-41). Preferably the trigger is shaped and the receptacle is shaped so that a pin moving through the passage cannot avoid contact with the trigger.

In addition in some forms, the trigger 10 may have a tripping region 26 that is able to interact with the driver 11 in an appropriate manner to control the rotation of the driver 11 about its driver axis 22. The driver 11 may comprise a trip pin 27 that is able to bear against the tripping region 26 of the trigger 10.

In a preferred embodiment the driver axis 22, retainer axis 15 and trigger axis 24 are all parallel to each other and when retained or entering, also parallel to the pin axis 16.

In order to explain how the retainer system 1 of the present invention works reference will now be made to the sequence of drawings of FIGS. 12-23 where the process of disengaging a pin P1 is described and in FIGS. 24-31 where the process of engaging a pin P1 is described.

Figure 12:
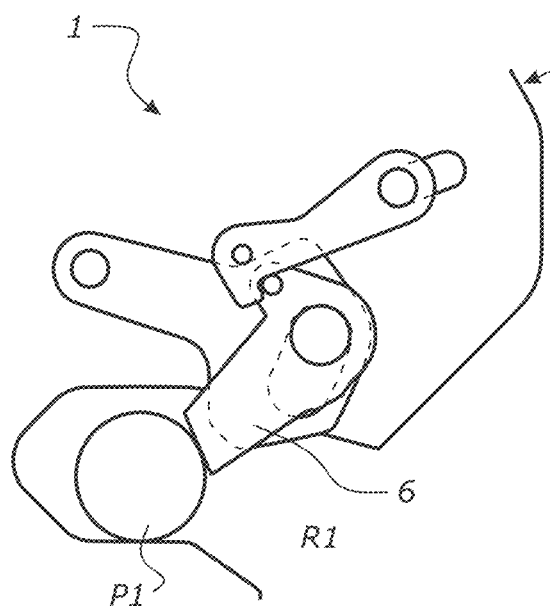
Figure 13:
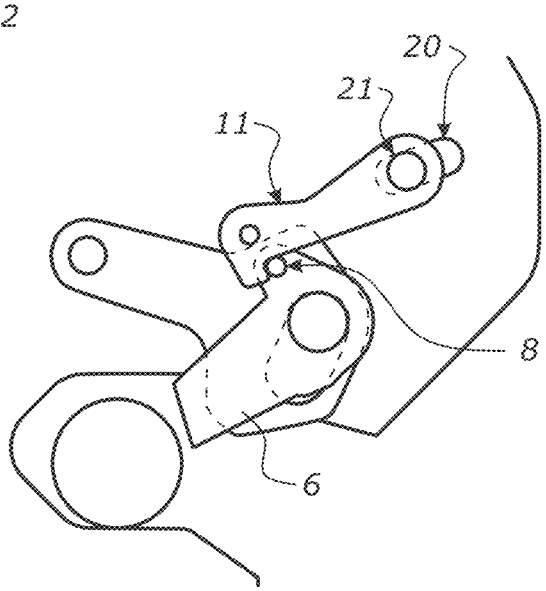
Figure 14:
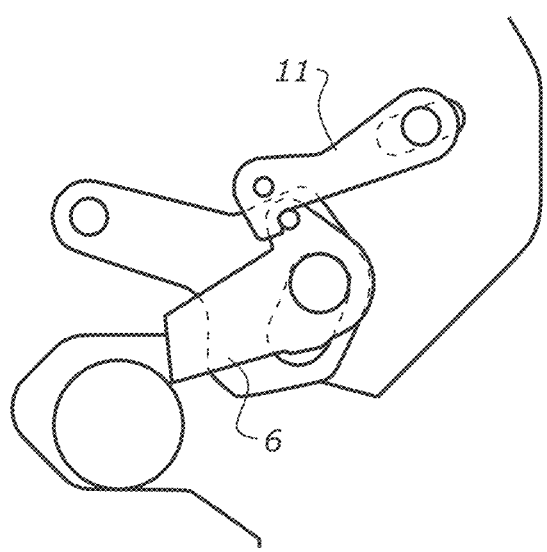

In FIG. 12 there is shown a pin P1 safely and securely retained at receptacle R1 by the retainer 6. To allow for the pin P1 to be removed from the receptacle R1 the driver 11 is caused to be displaced when it is coupled with the retainer lug 8. A driver actuator 9 (hydraulic ram 9) may be actuated by an operator to cause the driver 11 to displace in a direction to cause clockwise rotation of the retainer 6 as shown between FIGS. 12 and 16.

In an optional embodiment, a hydraulic ram 9 actuates the driver 11, and a hydraulic ram 40 actuates the second retainer 3. Both the hydraulic ram 9 and hydraulic ram 40 are preferably fed from the same hydraulic circuit, as shown in FIG. 52. For release of attachment, pressure is supplied to the hydraulic ram 40 and the second retainer 3 is retracted to release pin P2, simultaneously in a preferred embodiment, the first retainer 6 is retracted by the hydraulic ram 9, via the driver 11, to allow release of pin P1. The first retainer 6 however is reset to its retaining position without any hydraulic pressure being required due to the mechanical trigger mechanism 10 of the retaining system 1 being triggered by egress of the front pin P1. For attachment of an attachment A from the previously described state, the pins P1 and P2 are entered into the respective receptacles R1 and R2. Via reversal or release of hydraulic pressure, the hydraulic ram 40 extends the second retainer 3 to retain the rear pin P2. The first retainer 6 is independent of this second retainer 3 extending, due to the operation of the trigger mechanism 10 as described. However, the driver 11, is engaged with the hydraulic ram 9, and upon reversal or release of hydraulic pressure of the hydraulic ram 9, the driver 11 can return such as under bias (e.g. from a spring) to its first position.

Figure 15:
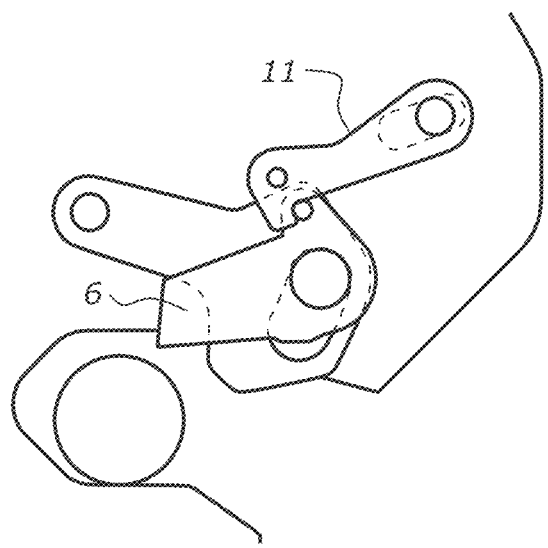

Continued displacement of the driver 11 to its second position will cause the retainer 6 to rotate sufficiently in a clockwise direction to no longer interfere with the removal of the pin P1 from the receptacle R1. Such displacement may be to completely remove the retainer 6 from projecting into the receptacle R1 as shown in FIG. 16 or still have it partially projecting into the receptacle R1 as shown in FIG. 15. In the preferred form the retainer 6 is completely clear of the receptacle R1. Preferably a pin P1 cannot push the retainer 6 to this position (as shown in FIGS. 16-19), as this may allow the retainer 6 to re-latch with the driver 11.

When the retainer 6 is in the retracted position, as for example shown in FIG. 16, the operator is able to move the excavator arm and hence the quick coupler C in order to manoeuvre the pin out of the receptacle R1. Whilst the retainer 6 is clear of the receptacle R1, the trigger 10 is presented with its triggering region 25 projecting into the receptacle R1. The triggering region projects sufficiently far into the receptacle R1 so that it will contact the pin P1 as the pin P1 leaves the receptacle R1.

It will be appreciated that different sized pins of different attachments may come to register at the receptacle R1. Therefore it is important that the trigger region 25 is sufficiently large so as to be able to present itself for contact with different sized pins as such leave the receptacle, without the pins being able to pass the trigger region 25 without actuating the trigger 10. As such, for illustrative reasons, a small pin P1 is shown egressing the receptacle R1—to show the extreme case and how the small pin can still activate the trigger 10. Likewise, on pin entry, a large pin P1 is shown entering the receptacle R1—the large pin P1 is shown to show the extreme case and how the large pin will not cause the retainer 6 to engage with the coupling region 25—as described later.

Trigger actuation occurs when the force of the pin P1 upon its removal or entry to the captive region acts on the trigger 10 and causes the trigger 10 to move such as by rotation on its trigger axis 24. In the orientation shown in the drawings such rotation is in an anti-clockwise direction. As the pin progresses out of the receptacle R1 as seen in the sequence of drawings of FIGS. 18 and 19, the rotation of the trigger 10 in an anti-clockwise direction about the trigger axis 24 causes the tripping region 26 to apply a force to the trip pin 27 of the driver 11. This causes a decoupling between the retainer lug 8 of the retainer 6 and of the coupling region 19 of the driver 11.

Figure 50:
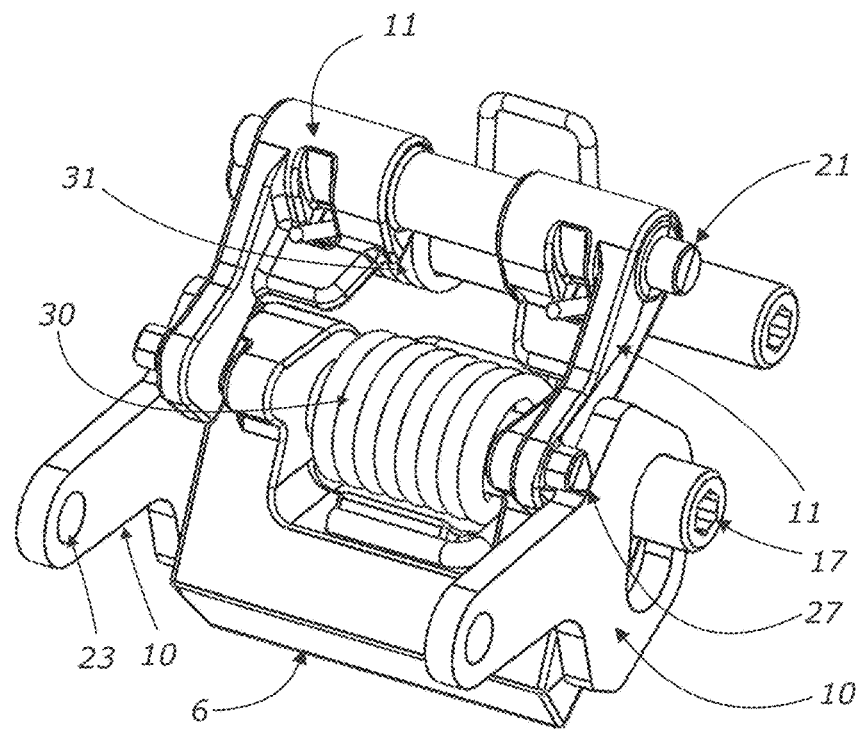
FIG. 50: shows a top perspective view of a retaining system of the present invention.
Figure 51:
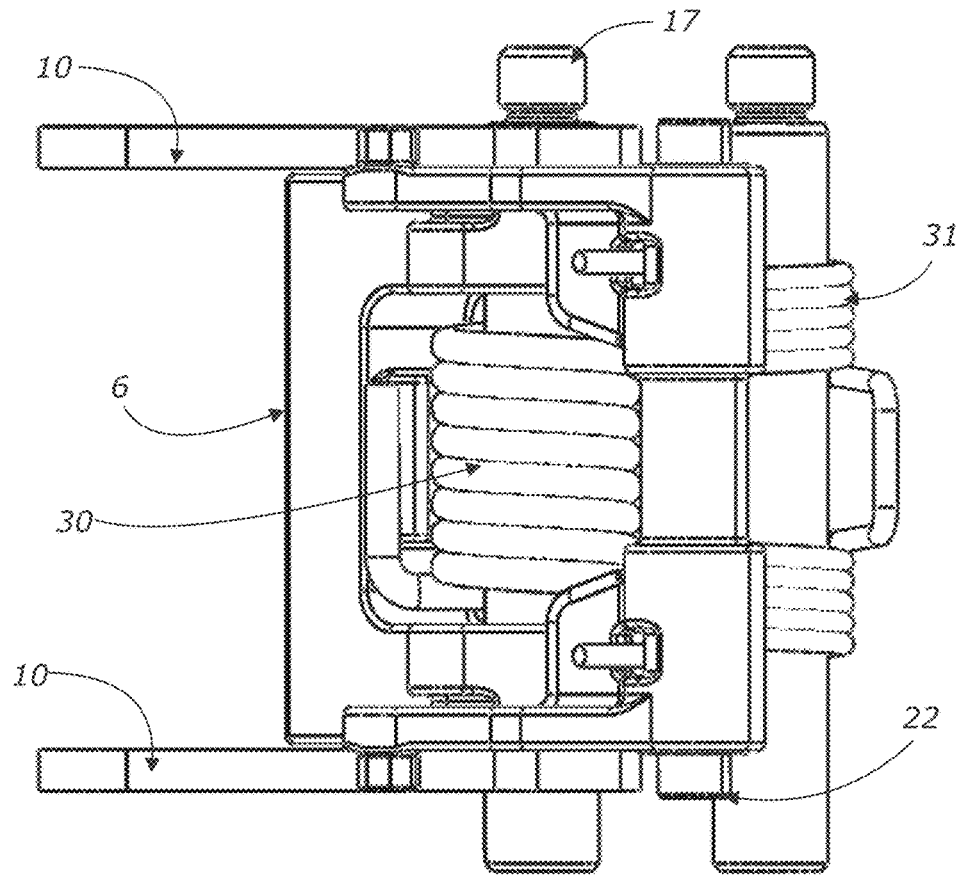
FIG. 51: shows a top view of a retaining system of the present invention

Upon decoupling of the driver 11 with the retainer 6, the retainer 6 is able to rotate back towards its retaining position. It is no longer being held by the driver 11 in its release position as shown in FIG. 18 but is able to rotate back in an anti-clockwise direction towards its retaining position. The retainer 6 is preferably biased to its retaining position by way of a spring such as a torsional spring 31 acting about the retainer axis 15. An example of the spring biases is shown in FIG. 49 to 51. This helps snap the retainer to its retaining position when the driver decouples.

The progression of the pin P1 out of the receptacle R1 after the decoupling of the driver 11 and the retainer 6, may allow for the retainer 6 to rotate to its retaining position as shown in FIG. 22. The pin P1 and the retainer 6 may be in contact during this progression but the pin P1 is no longer being retained in the receptacle R1 by the retainer 6.

Figure 20:
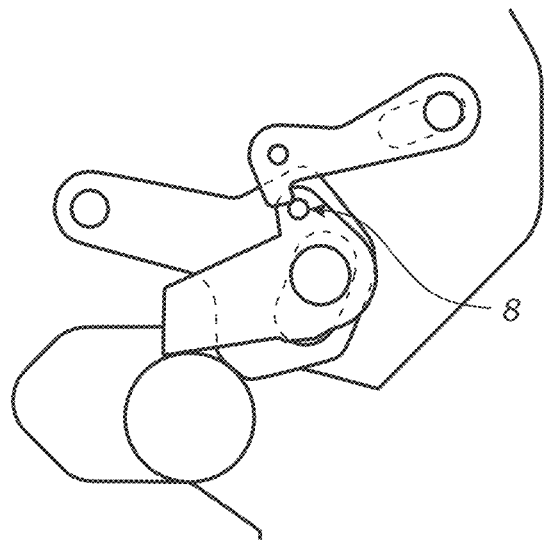
Figure 21:
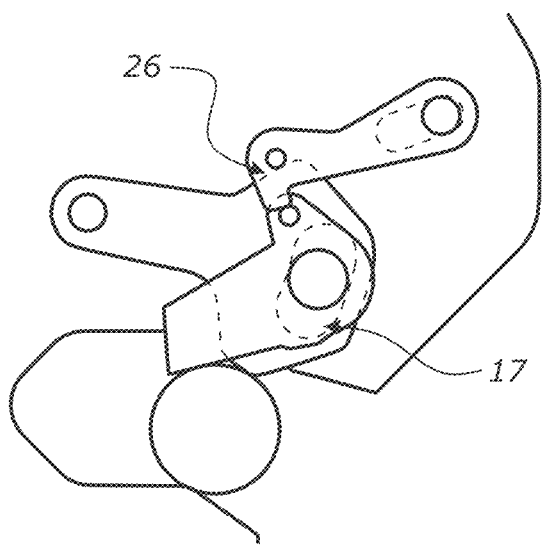

As can be seen in FIG. 20-22, the preferred geometry of the retainer 6 is such that its return to its retaining position is interfered with by the pin P1 at the time the P1 engages with the trigger region 25 of the trigger. This means that the trigger 10 may only be able to cause a tripping of the coupling between the driver and retainers (e.g. between the retainer lug 8 and the coupling region 19) once the pin P1 is sufficiently removed from the receptacle R1 to then not be prevented from further movement out of the receptacle R1 by the retainer 6 once the retainer 6 has been caused to trip. As can be seen in FIGS. 20-22, the retainer 6 comes to bear against the pin P1 once the tripping of the mechanism has occurred. However if the pin P1 is removed faster, or the bias of the retainer 6 is weak or slower to cause movement of the retainer 6 (such as by use of a hydraulic accumulator) then the retainer 6 will not bear against the pin P1 upon its exit.

FIG. 23 shows the retaining system reset to its first condition as shown in FIG. 11. The step between the retainer 6 rotating to its lower most point (FIG. 22) and the driver 11 recoupling with the retainer 6 (FIG. 23) is that the driver actuator 9 has allowed or caused the driver 11 to return to its first condition. The driver 11 may travel back due to the rotational and lateral spring bias (via spring 31) to its coupling condition, to recouple with the retainer 6.

Should the operator cause the release of actuation of the driver 11 e.g. via releasing the driver actuator 9 (e.g. by releasing hydraulic pressure from the driver actuator 9), either
 a) before the retainer 6 has fully raised (i.e. the retainer 6 is still coupled with the driver 11), then the retainer 6 will return back to its retaining position, or
 b) before the pin has egressed (i.e. the pin P1 has not actuated the trigger 10), then the retainer 6 will return back to its retaining position.

The Figures represent the operator causing release of the driver 11 at the stage of FIG. 23, when the pin P1 has egressed the receptacle R1. However, the operator may release the driver 11 from the stage of FIG. 20—where the trigger 10 has been actuated to trip the driver 11 from coupling the retainer 6 at the retainer lug 8. FIG. 19 shows the tipping point where the retainer lug 8 is going to trip off the coupling region 19.

In a preferred form as previously mentioned the retainer 6 is preferably biased to its retaining position by for example a torsional spring 30 as shown in FIG. 49-51. In addition, biasing of the driver 11 may occur. Such biasing may be by way of a spring 31 to push the driver 11 to its coupling condition as shown in FIG. 49. In FIG. 49 the same spring 31 is shown acting between the body 2 and the driver 11 in a direction to bias the driver 11 in an anti-clockwise rotational direction. This encourages the driver 11 to move via its rotational and translational coupling to its first condition. In other embodiments, not shown, the function of the spring 31 may be achieved by more than one spring.

Figure 55:
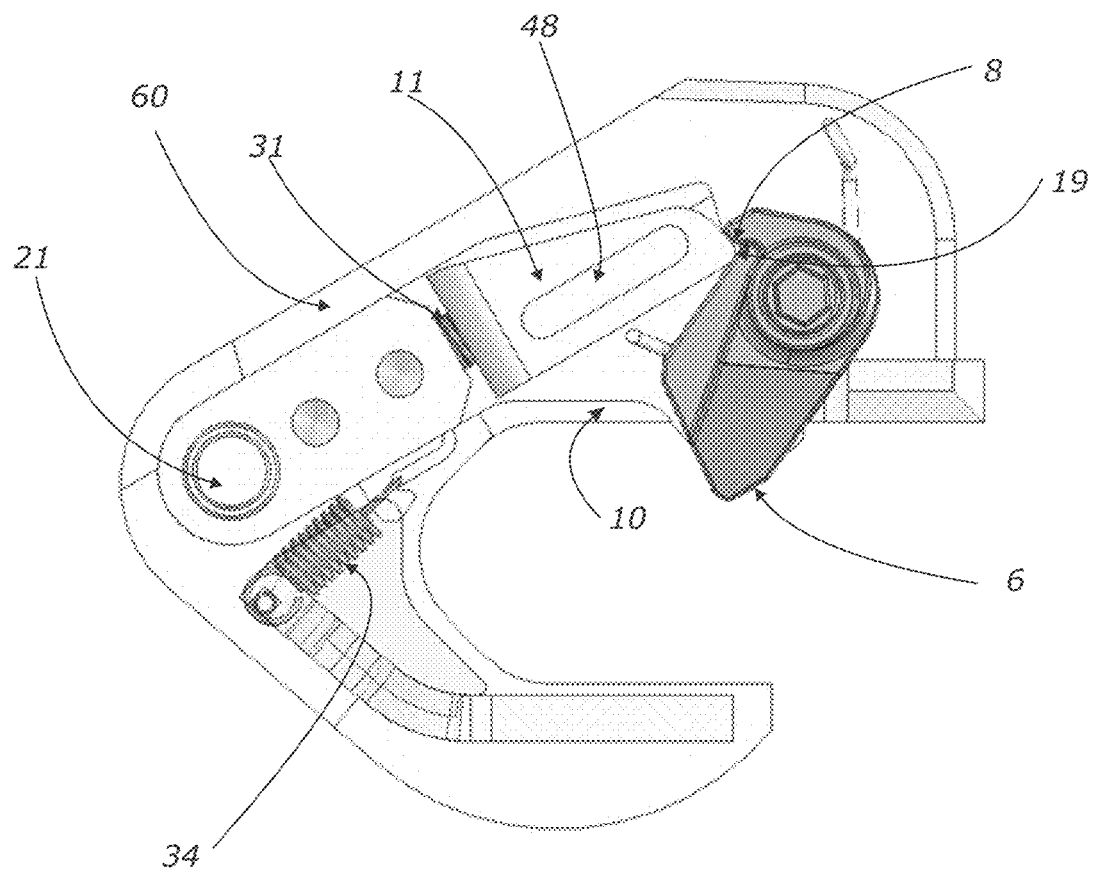
FIG. 55: shows a side view of a third version retaining system, with further features removed to clarify the driver and trigger.

The trigger 10 may be free to float, apart from, in a preferred embodiment, the biased driver 11 is pushing against the trigger 10—to in turn bias the trigger 10. Alternatively a separate bias may also be applied to the trigger 10. This bias may be provided by a spring (not shown in this embodiment, but shown as spring 34 in an alternative embodiment in FIG. 55) acting between the body 2 and the trigger 10 in a clockwise direction as seen in the Figures. The direct or indirect bias of the trigger 10 will help reset the trigger 10 to a condition where the trigger region 25 projects into the receptacle R1.

Preferably the trigger is able to come into contact with the driver as the pin engages the trigger and out of contact with the driver when the pin is not in contact with the trigger. Alternatively the trigger is always in operative contact with the driver. In alternative forms as described herein after, the trigger and driver may move in concert relative the coupler body between the coupled and decoupled conditions of the driver. Preferably the trigger is able to cause the driver to decouple from the retainer so that the retainer is not constrained by the driver from moving to its first position.

An operator may enter a lift mode by proceeding from a coupler condition as seen in FIG. 22 to a condition as seen in FIG. 23. A lifting mode is where both first and second retainers 6 & 3 are in the retaining position, but no pins are present in the respective receptacles. The operator, in a preferred embodiment, can case the coupler to move from the stage of FIG. 22 to the stage of FIG. 23 (i.e. to lifting mode) by causing a release or reversal of the hydraulic pressure so the second retainer 3 extends to its retaining position (shown in FIG. 1B), and because the hydraulic pressure is released to the driver actuator 9 also, the driver 11 is allowed to be biased back to couple with the first retainer 6.

Figure 24:
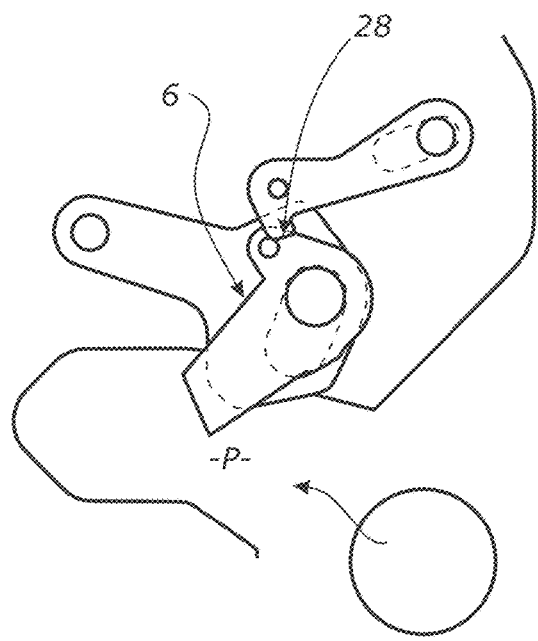

Reference will now be made to FIGS. 24-31 to show how a pin P1 is able to be engaged with a coupler C, for retention therewith, in a first engagement mode. In a first engagement mode for example, an old pin has been removed from the receptacle R1 and it is desired to be swapped for a new pin P1 of another attachment. The operator has triggered the application of hydraulic pressure (or similar means for actuation such as mechanical screw or the like) to cause the second retainer 3 to retract, and the first retainer 6 to raise up. The old pin is removed, which trips the trigger 10 and the retainer 6 moves to its retaining position. Note that the driver 11, is still located away from its biased condition (i.e. it is in its second position) because it is held there by the hydraulic ram 9. The operator can then enter a new pin, as shown in FIG. 24 into the receptacle R1 and this is secured at the receptacle R1 by the retainer 6. Even though the driver has not returned to a position to couple with the retainer that is in its first position. The operator enters pin P2 into receptacle R2—and the retainer 3 is extended to move to a position to retain pin P2. Retaining of pin P2 is able to be achieved independent of the retaining of pin P1.

The first engagement mode is the most typical mode when an operator is swapping attachments.

Figure 25:
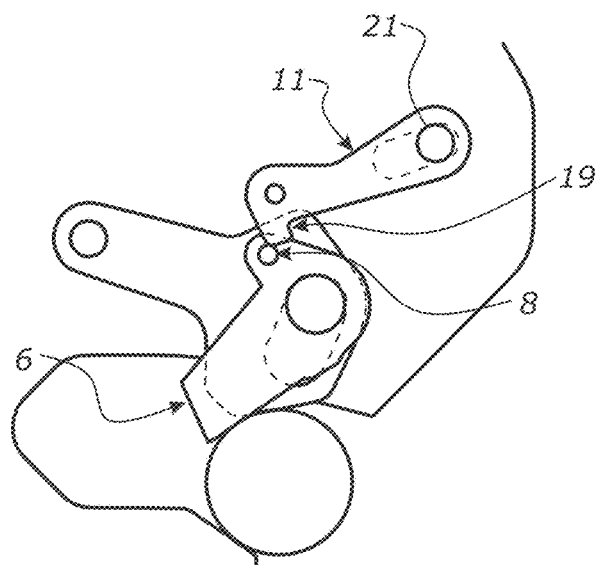

In FIG. 24 the retainer system 1 is shown in its retaining condition. The retainer 6 is in its retaining position (without a pin in the receptacle R1) and extends partially into the receptacle R1 after being tripped and reset by the old pin egressing the receptacle R1. The driver 11 is still in its actuated position. The quick coupler C is then manoeuvred by an operator to introduce the new pin P1 into the receptacle R1 through the mouth M. This movement of the pin P1 into the receptacle R1 causes the retainer 6 to rotate clockwise as seen in FIG. 25. The lug 8 may act against the driver 11, and but does not re-latch.

A preferred feature that prevents re-coupling of the driver 11 and lug 8 (i.e. at the coupling region) is a guiding surface 28 as shown in FIG. 24. The guiding surface abuts with the lug 8, or another part of the driver 11, to prevent coupling of the driver 11 and retainer 6. As a pin P1 enters into the receptacle, the pin P1 engages the retainer 6. The lug 8 of the retainer 6 abuts the guiding surface of the driver 11 and so prevents coupling between the driver and retainer until the driver has returned to a position where it can couple with the retainer when the retainer is in its first position. The driver is preferably slower to return to its first position than the retainer. The trigger 10 in this embodiment is free to float with respect to movement caused by the pin P1.

The pin P1 is able to move to fully seat in the receptacle R1 as a result of the retainer 6 able to rotate in idle and let the pin P1 pass. Once the pin P1 is sufficiently passed the retainer 6 as shown in FIGS. 28 and 29, the retainer 6 is, under bias as previously described, able to rotate anti-clockwise to its retaining position.

Figure 26:
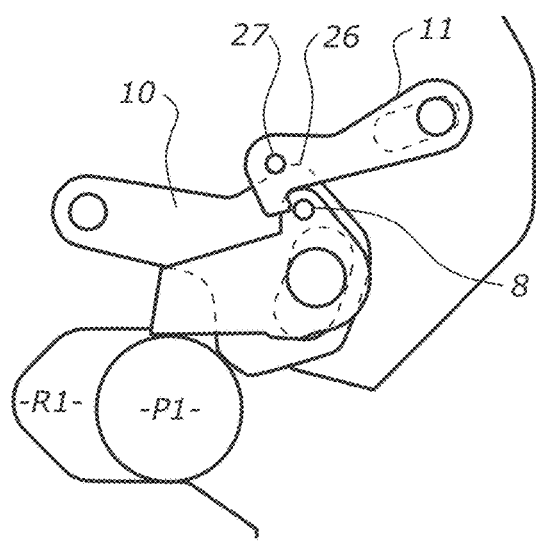
Figure 27:
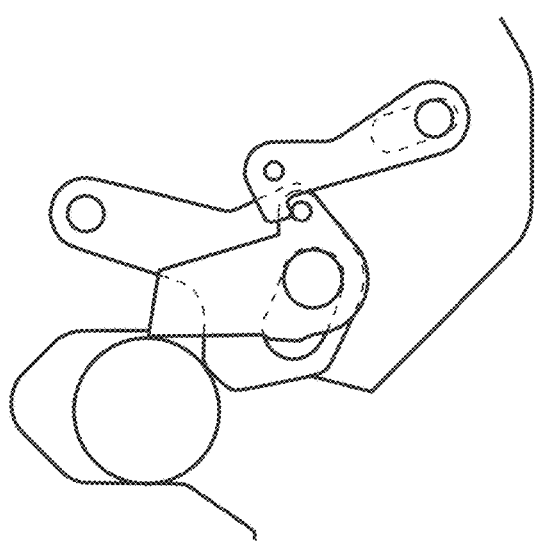

During the movement of the pin P1 into the receptacle R1, the trigger 10 may also be displaced from its active position as shown in FIG. 24 to its tripping position as shown in FIGS. 25-26. However in doing so, the trigger 10 is not active in resetting the retainer 6 back to its retaining position nor active in establishing or disconnecting the coupling between the retainer lug 8 and the coupling region 19—this is because the retainer 8 is not coupled to the driver 11. In this instance the trigger 10 is merely idle and is able to move out of the way of the pin P1 as the pin P1 enters the receptacle R1.

Once the pin P1 is fully seated in its receptacle R1, or the retainer 6 is able to get past the pin P1, the retainer 6 is moved, or moves, to its retaining position as shown in FIG. 29, via its rotational bias. At this point the operator (once the front pin P1 is retained), in a preferred embodiment, releases or reverses hydraulic pressure to the hydraulic cylinder 40 so the rear pin P2 can be retained by the second retainer 3—simultaneously the driver 11 can return to its biased position—shown in FIGS. 30 to 31.

The driver 11 is able to be reset or is reset, to its first position, for coupling with the retainer lug 8, upon actuation or hydraulic reversal or release of the driver actuator 9, associated with the driver 11—as shown in FIG. 31.

The driver 11 is then coupled to the retainer 6 to again be able to rotate the retainer 6 to its release position to allow for release of the pin P1 from the receptacle R1 as indicated in FIGS. 12-23.

The trigger region 25 of the trigger 10 is shaped to act as a camming surface allowing for the movement of the pin P1 past the trigger 10. The trigger region 25 preferably has rounded surfaces that do not inhibit the motion of the pin P1 in and out of the receptacle R1. This allows for the trigger 10 to be rotated about its trigger pivot 24 yet not interfere with the motion of the pin P1 during its movement in and out of the receptacle R1.

The shape of the retainer 6 is such that when the pin is in the receptacle R1 and the retainer 6 is in its retaining position, it will retain the pin P1 in the receptacle R1 until such time as the retainer 6 is actively moved to its release position. A stop 33 as has herein been described helps prevents rotation of the retainer 6 beyond a certain limit thereby ensuring the pin P1 remains secure in its receptacle R1 when the retainer 6 is in its retaining position.

The geometry of the retainer 6 is preferably configured so the retainer 6 does not engage with the actuated driver 11 when a pin P1 is received into the receptacle R1 (and the retainer 6 is rotated to its release position as seen in FIG. 26). As can be seen in FIGS. 25 to 30, the driver 11 is not preventing (i.e. does not couple with the retainer 6) the biasing back of the retainer 6 to its retaining position under the influence of its torsional spring 30 (shown in FIG. 49). In alternative embodiment, it is solely the shape of the trigger 10 that causes the movement of the driver 11 to prevent coupling of the lug 8 with the driver 11, when a pin P1 enters the receptacle R1.

The geometry around the lug 8 region is important to ensure that the driver 11 does not restrict the movement back of the retainer 6 to its retaining position once the pin P1 is sufficiently received in its receptacle R1. The shape of the retainer 6 and the tripping region 26 relative to the trip pin 27 is important to ensure that the retainer lug 8 is not inhibited, from movement between the retainers first and second positions, by the driver 11 once the pin P1 is sufficiently inside of the receptacle R1.

Subsequent rotational displacement of the driver 11 back towards its coupling position can then occur.

An operator, in one embodiment, can cause engagement of the pin P1 by way of a second and third coupler engagement mode.

1) In a second engagement mode—the coupler was previously in a lifting (first) mode. I.e. at least the retainer 6 is in a retaining position and latched with the driver 11. An operator manoeuvres the coupler C so the pin is moved into the receptacle R1—as shown in FIGS. 42-45, without retracting the retainer 6. The difference between the second engagement mode and the first engagement mode is that the driver 11 is not actuated to its second position in the second mode.

Figure 47:
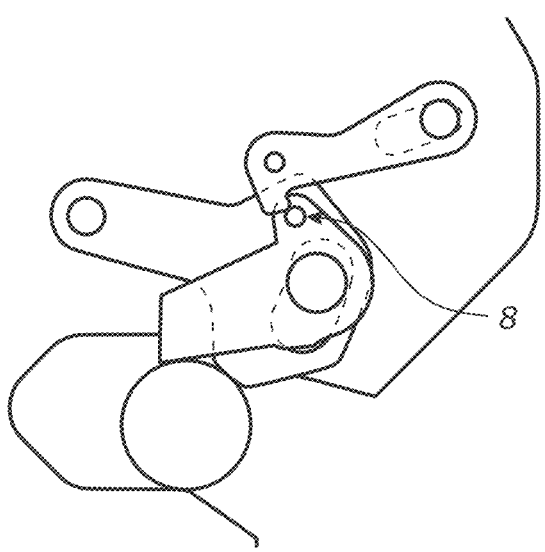
Figure 48:
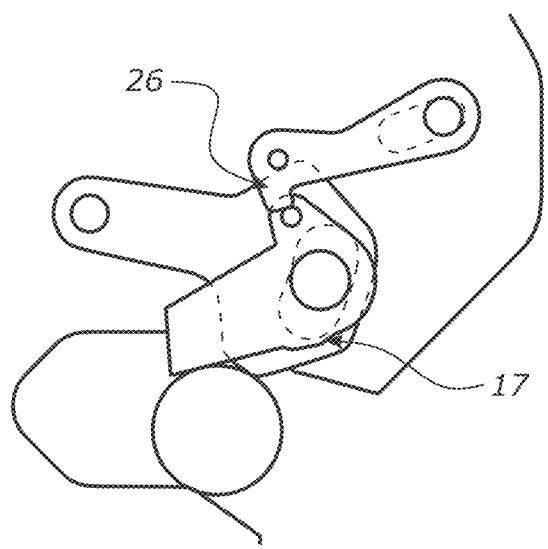

2) In a third engagement mode—the coupler was previously in a lifting (first) mode. I.e. at least the retainer 6 is in a retaining position and latched with the driver 11. An operator causes retraction of the retainer 6 by actuating the driver 11. The operator manoeuvres the coupler C so the pin is moved into the receptacle R1, the trigger 10 is tripped to reset the retainer 6 to its retaining position—this process is partially shown in FIGS. 46-48. The operator then enters pin P2 into receptacle R2—then releases actuation pressure so the retainer 3 can move back to its retaining position to retain the pin P2. Retaining of pin P1, is independent of the retaining of pin P2.

In one example the driver is preferably mounted relative the body to move in a rotational manner only for moving between a coupled and decoupled condition. Preferably trigger is mounted relative the body to move in a rotational manner only. Preferably the rotational mounting of the trigger and retainer and driver relative to the body is about respective rotational axes that are parallel each other. Preferably the trigger can cause the driver to move relative the body and relative the retainer to decouple the driver from the retainer. Preferably the trigger is presented for contact by the pin on both egress and ingress of the pin from and to the captive region. Preferably the retainer, when in said first position, prevents the egress of said pin when said pin is retained in the receptacle, and can be moved against the bias acting on the retainer to allow the ingress of said pin into the receptacle and past the retainer. Preferably the retainer in the second position does presents itself to not be contacted by the pin when in the receptacle.

Figure 32:
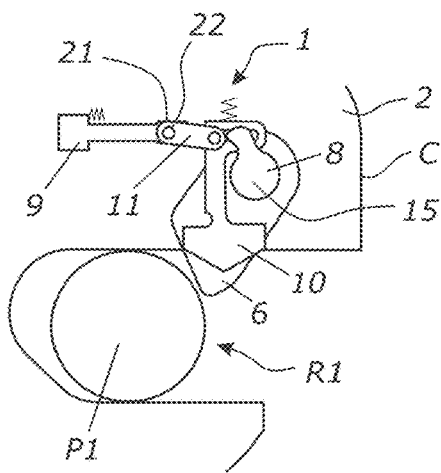
Figure 33:
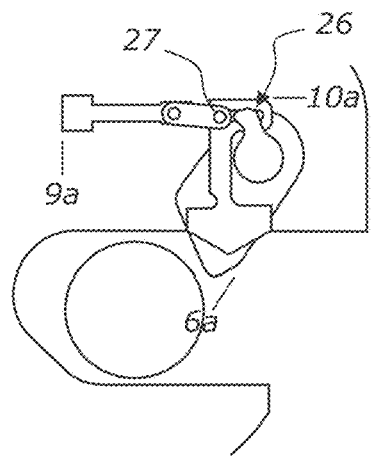
Figure 34:
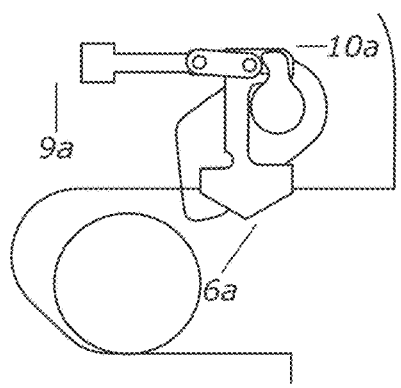

A variation of the mechanism shown in FIGS. 11-31 & 42-51 is now described with reference to FIGS. 32-41. In this variation rather than a driver 11 pulling the retainer 6 from its retaining position 6a to its fully retracted position 6b, the driver 11 is configured to push the retainer 6 from its retaining position to the retracted position. In FIG. 32 there is shown a coupler C that has a front receptacle R1 within which a front pin P1 is registered. The FIGS. 32-41 show a pin P1 being allowed to be removed from a coupler, via the retainer being actuated to a release positions, subsequent tripping of the trigger via the pin P1 causes the retainer to move back to its occluding position. Figures of this embodiment, with ingress of the pin are not shown.

Provided as part of the retaining system 1 there is a retainer 6 pivotally mounted to the body 2 of the coupler C for rotation about its rotational retainer axis 15. Forming part of, or engaged therewith, is a retainer lug 8 that also rotates with the retainer 6. The retainer lug 8 is able to be engaged and coupled by a driver 11 that is able to be driven by a driver actuator 9. In this embodiment, coupling and decoupling does not necessarily mean connecting and disconnecting respectively. The driver 11 may or may not be still connected to the retainer 6 when decoupled, but the driver 11 has no drive on or cannot impart force to the retainer 6 until it is coupled. I.e. the drive to the driver can be decoupled, instead of the driver 11 being decoupled with the retainer/lug 8. In the embodiment shown, the driver 11 is decoupled mechanically via coming out of contact with the lug 8.

Figure 35:
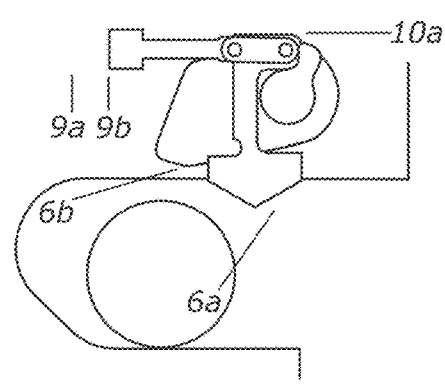
Figure 36:
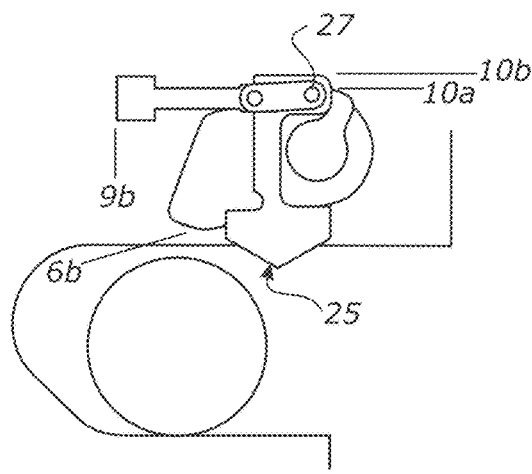
Figure 37:
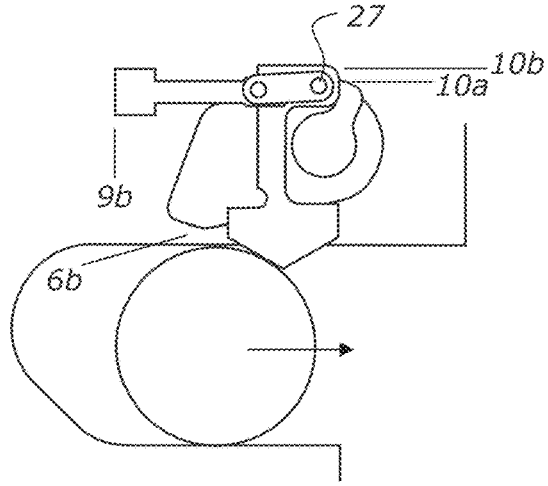
Figures 42, 43:
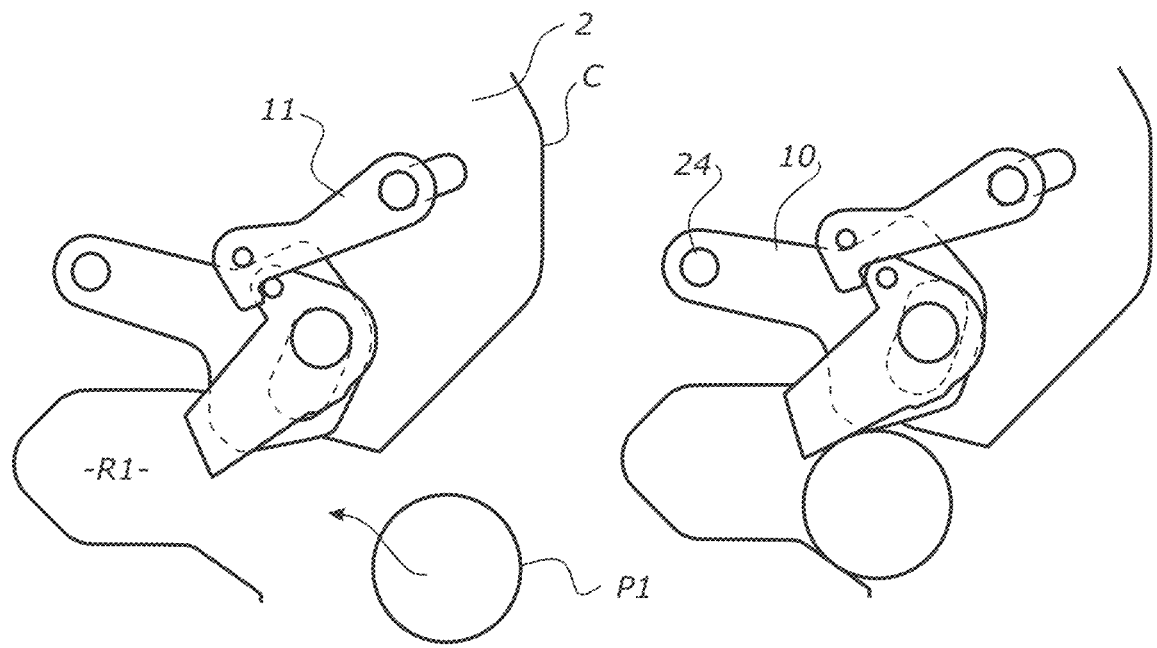
FIGS. 42-45: show detailed side schematic views of a pin of an attachment entering a retaining system after the retaining system was in 'lift mode' (second engagement mode).
Figures 44, 45:
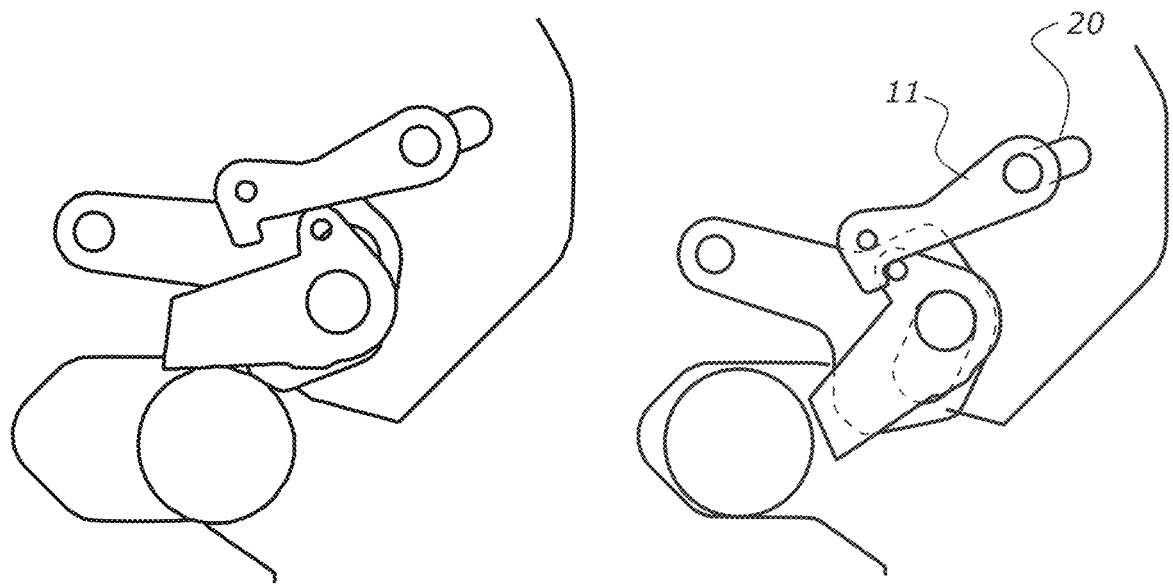
Figure 46:
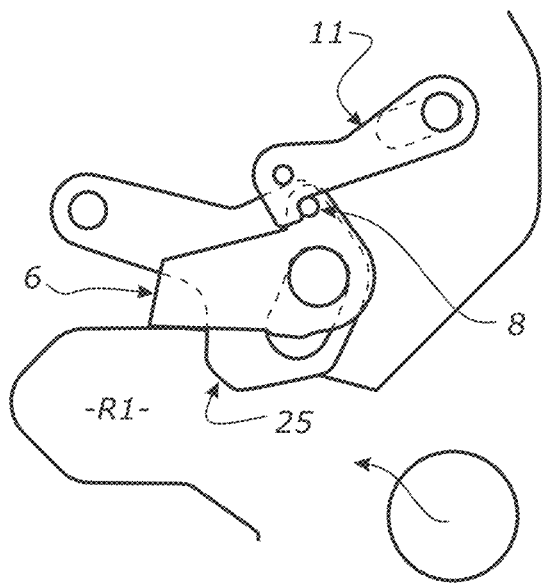
FIGS. 46-48: show detailed side schematic views of a pin of an attachment entering a retaining system after the retaining system was in 'lift mode' and the operator actuates the retaining system for engagement (third engagement mode).

The driver actuator 9 can be caused to displace (between position 9a and 9b) the driver 11 to, when coupled, push against the lug 8 and cause the retainer 6 to move from its retaining position as shown in FIG. 32 to a released position as shown in FIG. 35. The driver 11 itself is able to both displace and rotate. The driver 11 may for example be mounted in a pivotal manner to the driver actuator 9 at a driver axle 21 to define a driver axis 22 for the driver 11.

A preferred feature that prevents re-latching of the driver 11 and lug 8 (i.e. at the coupling region) is a guiding surface 28 as shown in FIG. 39. The guiding surface abuts with the lug 8, or another part of the driver 11, to prevent coupling of the driver 11 and retainer 6. As a pin P1 enters into the receptacle, the pin P1 contacts and rotates the retainer 6. The lug 8 of the retainer 6 abuts the guiding surface of the driver 11 and so helps prevent coupling between the two. The trigger 10 in this embodiment may move due to the driver 11 being engaged with the trigger 10.

Like the retaining system 1 as described with reference to FIGS. 11-31, a trigger 10 is provided that is able to be displaced by the pin P1 entering and exiting the receptacle R1. When the retainer 6 is in its retracted position as shown in FIG. 35, removal of the pin P1 from the receptacle R1 as shown in FIGS. 36-39 can cause the trigger 10 to move and decouple the driver 11 from the retainer lug 8. Similar to the retaining system 1 as described in FIGS. 11-31, the trigger 10 comprise a slot to carry or guide the driver 11. The slot 26 is formed by the trigger 10, as shown in FIG. 32, and retains the pin 27 of the driver 11. The slot also comprises/or is the tripping region 26 that engages the pin 27 of the driver 11. The tripping region 26 allows actuation of a trip pin 27 (between positions 10a and 10c) of the driver 11 to move along a defined tripping surface or slot 26 formed by the trigger 10.

Decoupling of the driver 11 with the lug 8 can cause decoupling to occur (when the trigger is at position 10c) and for the retainer 6 to snap back to its retaining position once it is decoupled from the driver 11. Decoupling may not occur between positions 10a and 10b, but will occur past 10b towards position 10c.

In this embodiment, it is clear that movement of the trigger 10 can be linear with respect to the body 2. Other embodiments show a purely rotational movement of the trigger when triggered. It is envisaged it could also be a combination of rotational and linear movement.

Figure 54:
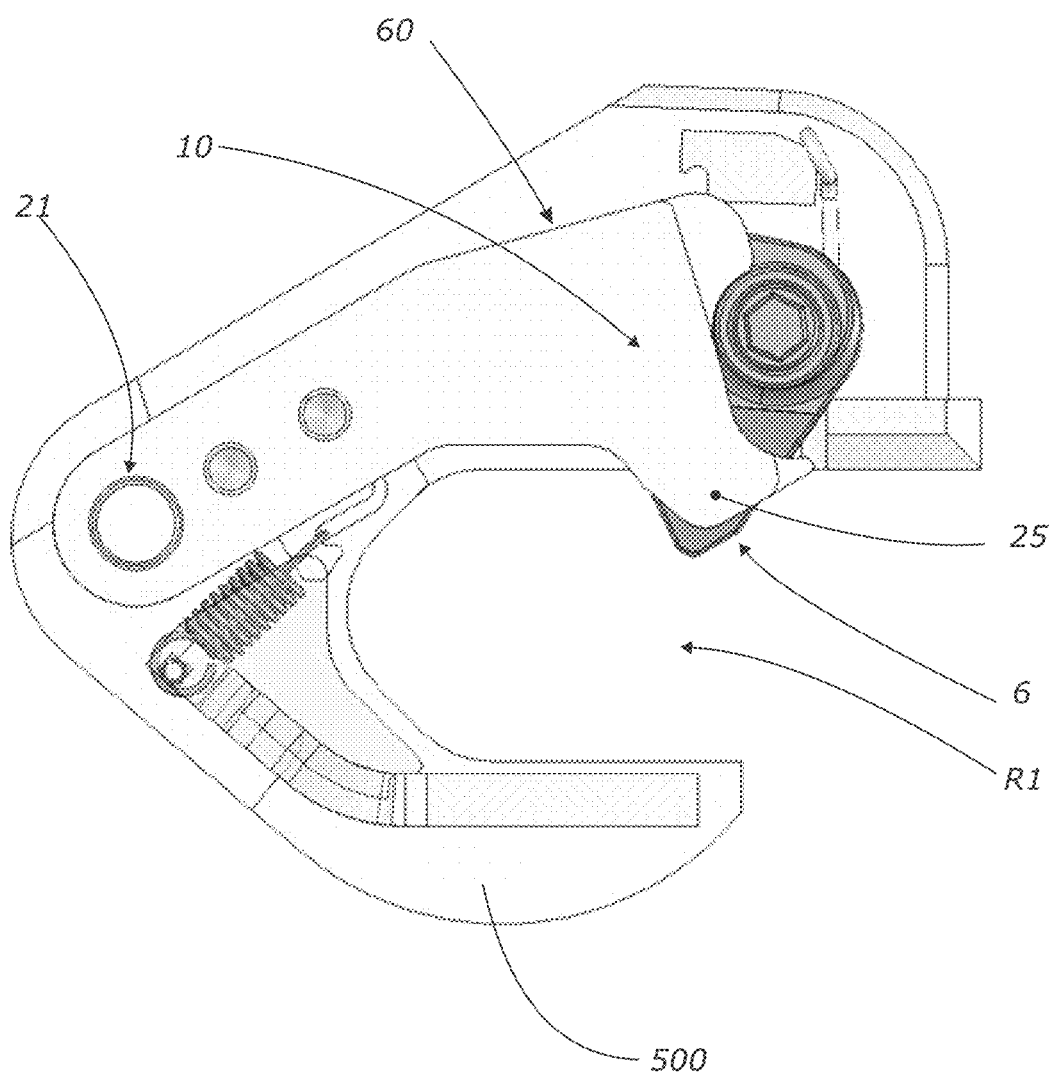
FIG. 54: shows a side view of a third version retaining system.

A combination of the first variation (as shown in at least FIG. 11) and the alternative variations (as shown in at least FIGS. 32 and 54) is envisaged to be within the scope of the inventions.

The first embodiment as shown in at least FIG. 11, when in a decoupled condition, the driver 11 and retainer 6 are preferably disconnected. In other embodiments the driver 11 and retainer 6 are connected, but are in a decoupled condition, so the driver 11 cannot control the position of the retainer 6. Thus the driver 11 is ineffective to drive but is still able to follow and be connected to the retainer 6, much like the variation as shown in at least FIG. 32. And likewise for the coupled condition of the driver 11 and retainer 6, the driver 11 and retainer 6 may be connected to each other or not connected to each other, but in both embodiments, in the coupled condition the driver 11 is able to affect the retainer 6.

The actuation of the driver 11 may occur manually such as through a screw thread mechanism. Alternatively the actuation of the driver 11 may be by way of a hydraulic ram. In a preferred form there are two hydraulic rams provided for the coupler C for actuation of both the driver 11 (actuator 9) as well as the second retainer 3 (actuator 40)—this is shown in FIG. 52.

Preferably one of the trigger and retainer (e.g. the retainer lug) is able to engage with a region of the driver to hold the driver in a position to prevent the driver from coupling with the retainer. Preferably the trigger is able to house and locate one or more of the driver actuator, the driver and the driver spring. Preferably the retainer lug engages with a region of the driver, to hold the driver and associated trigger when the retainer is not coupled with the driver in a condition to not allow said coupling.

A variation of the mechanism described above is now described with reference to FIGS. 54-83. This variation continues with the same reference numerals as used above in the previous two variations. In this variation the driver 11 is part of, and located and carried by, a driver assembly 60. The driver assembly 60, comprises the driver 11, the driver actuator 9, the return spring 31, an extension that protrudes into the recess R1 to act as a trigger 10, as well as other parts. The trigger 10 can actuate the driver assembly to rotate about an axle 21, when it is moved by an external force, such as a pin entering or egressing the receptacle R1.

Having the driver assembly 60 carry the trigger 10 means that there are less connections of the coupling system to the body 2. For example in the variation shown in FIG. 55, the driver assembly 60/driver 11 uses the same connection point as the trigger 10 to the body 2, which is the driver/trigger or driver assembly axle 21. In this embodiment the driver assembly axle 21 acts as the axle that the driver 11, and the trigger 10, can rotate about relative the body.

The reduction of connection points to the body 2 allows the coupling system to be easily manufactured and/or modular between different sizes of body 2. The modularity allows it to be used on different sized bodies for different sized machinery. The reduction of connection points may increase manufacturing efficiencies and may also aid in repair and/or maintenance of the coupling system.

In this embodiment the driver 11 moves with a purely translational movement, with respect to the trigger 10, to drive the retainer 6. However the driver 11 also moves on a rotational path due to driver assembly 60 being able to rotate about the axle 21. The driver assembly 60 rotates when the trigger region 25 is caused to move by a pin P1.

The driver assembly 60 comprises a hydraulic ram 9 to drive the driver 11. The driver assembly comprises a return spring 31 to bias back/return the driver 11, much like in the previous variations. However in this variation the return spring 31 is a tension spring, instead of a torsional spring.

Figure 56:
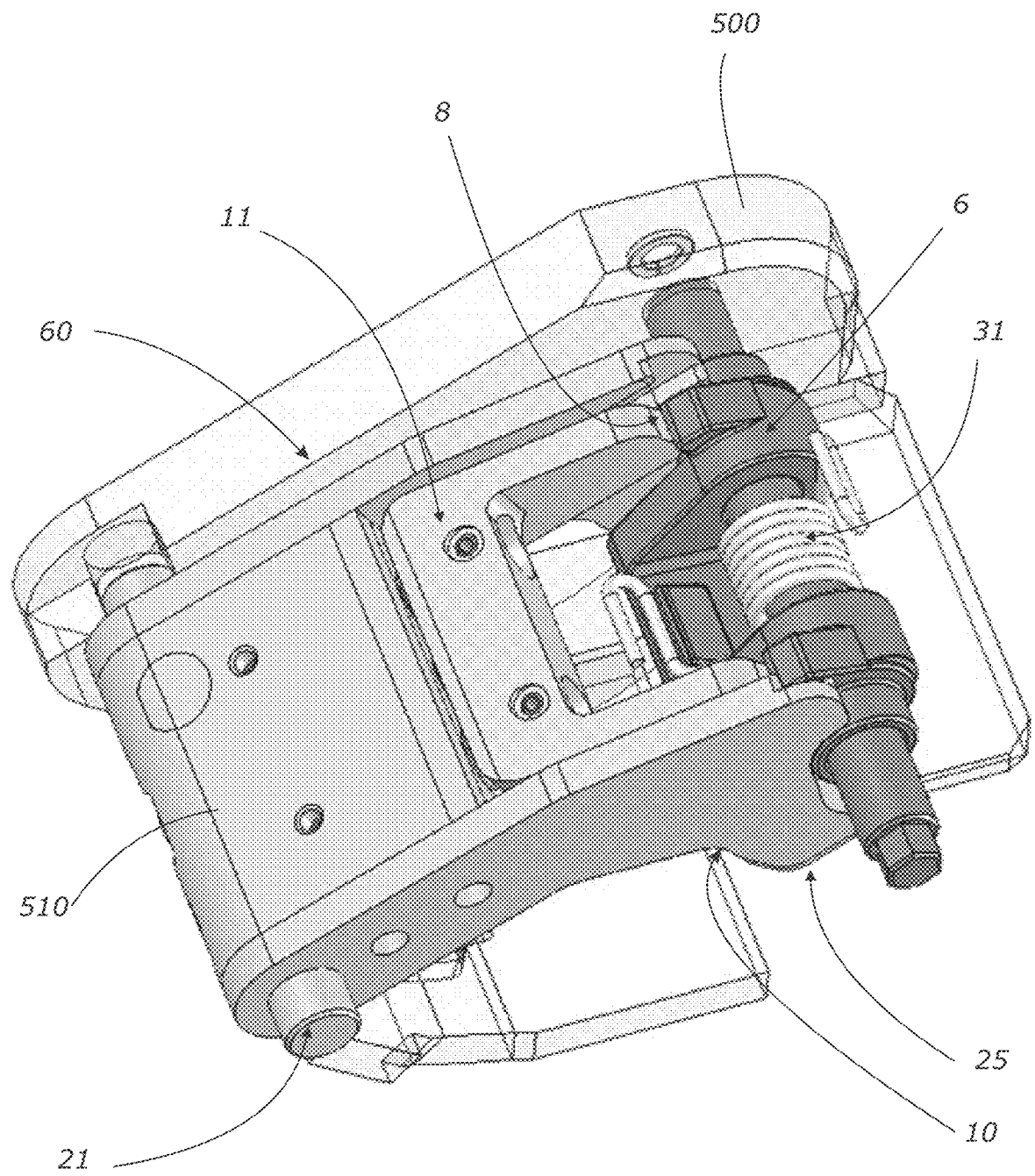
FIG. 56: shows a top rear perspective view of FIG. 55.
Figure 57:
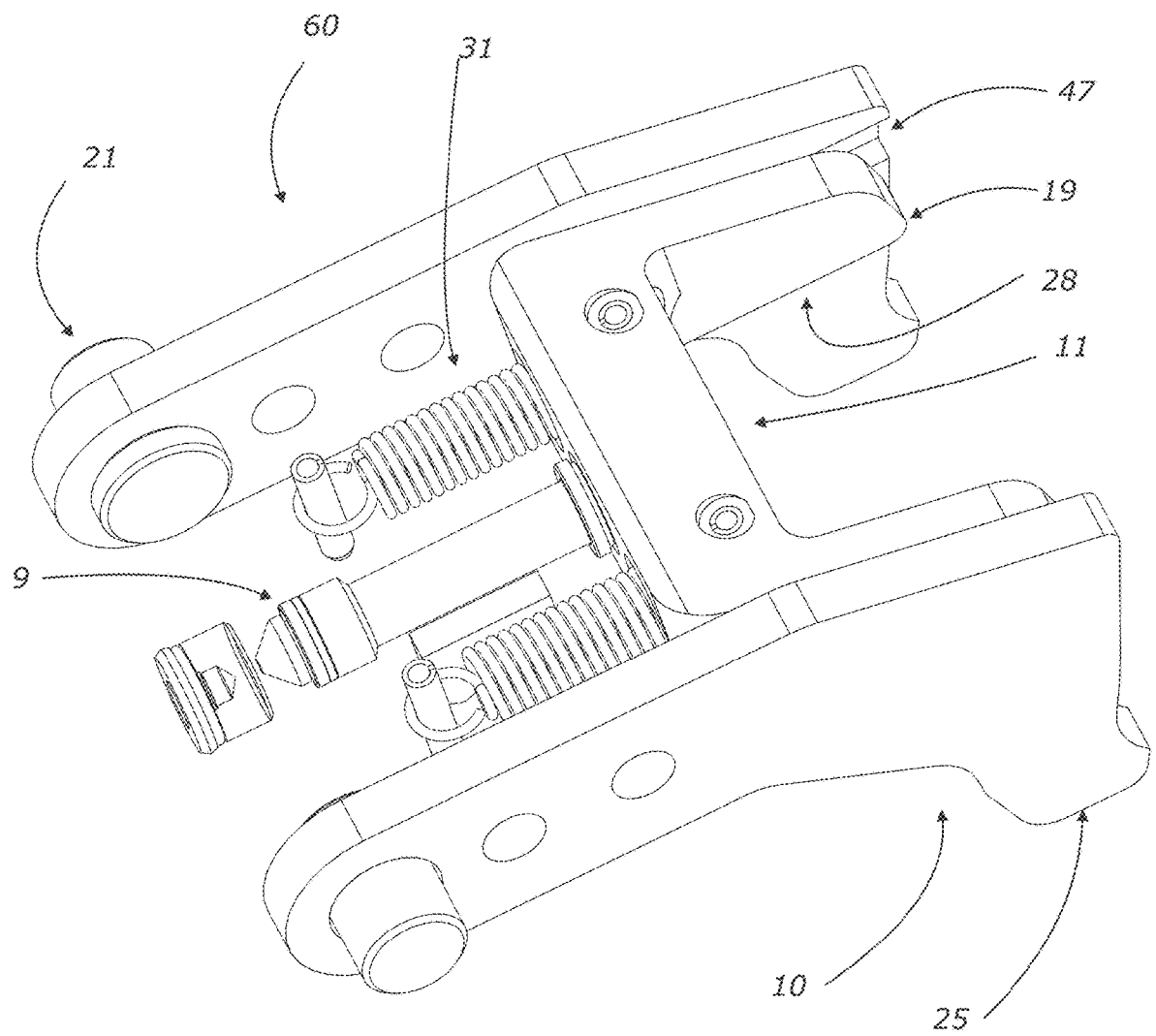
FIG. 57: shows a top rear perspective view of FIG. 55, with the trigger housing removed to highlight the driver ram and return springs.

Like the previous embodiment, the trigger 10 preferably has two trigger regions 25 that extend into to the receptacle R1 one for pin entry contact and one for pin exit contact. As seen in FIG. 56, the driver assembly 60 has an intermediate housing portion 510 that is integral with or engages with the trigger 10. The housing portion 510 is able to house the hydraulic ram 9 and the return springs 31 that drive and retract the driver 11 respectively. FIG. 57 shows the trigger 10, the hydraulic ram 9 and the return springs 31, but hides the intermediate housing portion for clarity. The return springs 31 are fixed at one end to the trigger 10, and at the other end to the driver 11.

The driver 11 is able to translate with respect to the trigger 10. In the embodiment shown in the Figures, the driver 10 translates with respect to the trigger 10 along a linear translational path that may extend radial to the rotational axis of trigger axle 21. The driver 11 is able to be guided in operation along this linear translational path via guide means. In the embodiment shown, the guide means are a protrusion 48 and a complimentary guide channel 47. The protrusion 48 is located on the driver 11, and the complementary guide channel 47 is part of the drive assembly 60. The protrusion 48 can be seen in FIG. 55, and the guide channel 47 can be seen and FIG. 57. There may be numerous mechanisms and configurations to allow the driver 11 to be mounted with the drive assembly in a translational manner with respect to the trigger 10.

The driver 11 operates in a similar function to the previous embodiment described. The driver 11 comprises a coupling region 19 that can couple with a lug 8 on the retainer 6. As the driver 11 is driven forward by the hydraulic actuator 9, the retainer 6 is rotatably forced about its rotational axis so that the region of the retainer 6 that extends into the receptacle R1 is removed from the opening of the receptacle to allow a pin P1 to pass therethrough. As a pin P1 passes there through, it will interfere with the region 25 of the trigger 10, to therefore trip the trigger 10 to raise the driver assembly 40, and trigger 10 about the axle 21. In doing so, de-coupling the coupling region 19 so that the driver 11 no longer engages with the retainer 6. As such, the retainer 6 is then biased back into the opening of the receptacle R1 via a torsional return spring 31.

A feature that prevents re-latching of the driver 11 and lug 8 (i.e. with the coupling region) is a guiding surface 28 as shown in FIGS. 57-59. The guiding surface 28 abuts with the lug 8, or another part of the driver 11, to help prevent coupling of the driver 11 and retainer 6. As a pin P1 enters into the receptacle R1, the pin P1 contacts and rotates the retainer 6. The lug 8 of the retainer 6 abuts the guiding surface 28 of the driver 11 and so prevents coupling between the two. The trigger 10 in this embodiment moves with the driver 11 as the driver 11 is carried directly by the trigger 10.

In this embodiment, there is no tripping region in FIG. 26, as the trigger 10 now carries the driver 11. As such, movement of the trigger 10, when triggered, directly moves the carried driver 11.

The driver 11 and the trigger 10 in combination may be called a trigger/driver assembly. The tripping region 25 may be located on the driver 11 or driver actuator of a trigger/driver assembly. This alternative is not shown.

In order to explain the retainer system 1 shown in FIGS. 54-57, reference will now be made to the sequence of drawings of FIGS. 58-66 where the process of engaging a pin P1 is shown and in FIGS. 67-83 where the process of disengaging a pin P1 is shown.

FIGS. 58-66 show a pin entering into the retaining system 1, when the retaining system is the first engagement mode, which is the most typical mode when an operator is swapping attachments. In the first engagement mode the driver 11 is already extended from the previous disengagement process.

FIG. 58 shows the driver 11, and in this embodiment, the associated trigger 10, held up via the retainer lug 8 engaging with tripping region 26 (partially hidden in theses Figure for clarity to see the driver 11, but can be seen in FIG. 57). As the lug 8 is engaged with the tripping region 26, the trigger 10 does not extend substantially into the passage P to occlude the passage P. The pin P1 can enter into the passage P of receptacle R1, with or without contact to the trigger region 25.

Figure 64:
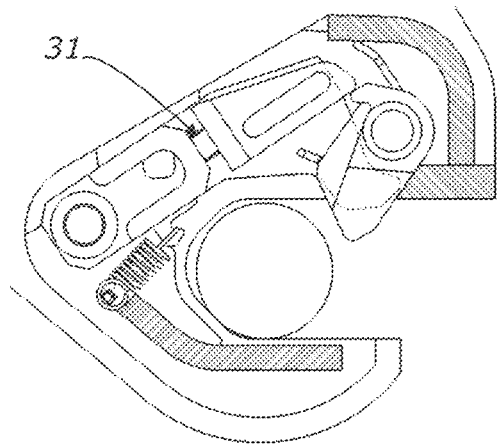
Figure 65:
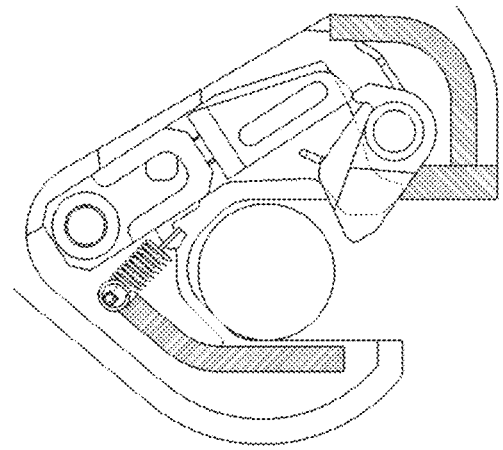
Figure 66:
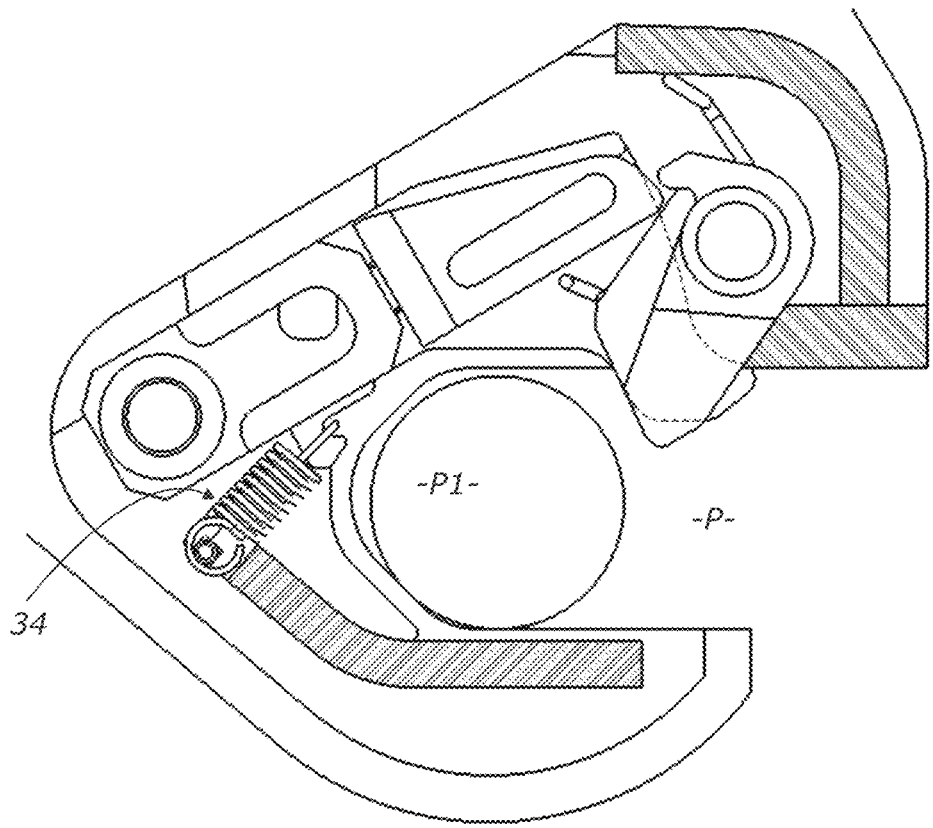

As the pin P1 passes through the passage P to enter the receptacle, the pin P1 contacts the retainer 6, therefore rotating the retainer 6 about the retainer shaft 17. The retainer 6 biases back to its biased condition once the pin P1 has sufficiently passed. The trigger 10 does not bias back to its biased condition, until the user causes release of hydraulic pressure from the driver ram 9, to allow the driver return spring 31 to pull back the driver 11 to its retracted position— as shown in FIGS. 64-66. When the driver 11 returns to its retracted position, the trigger 10 is able to rotate about its trigger axle 21, to its biased position, as the tripping region 26 is no longer hindered by the retainer lug 8 (FIGS. 65 to 66). The trigger may be biased by the trigger return spring 34. This may act on the trigger and/or on the driver to help cause the trigger/driver to rotate clockwise in the orientation shown in the Figures. Whilst the driver 11 is extended, the tripping region 26 of the trigger 10, and the retainer lug 8 engage with each other.

The retainer 6 is seen at one of its full rotational limits in FIG. 60 with a pin P1 as large as possible. Smaller pins would not rotate the retainer 6 to this extent (but can still be used effectively), but illustrating the large pin P1 shows that the lug 8 of the driver 11 never leaves, or extends past, the guiding surface 28, and as such the driver 11 does not couple at the coupling region 19 with the lug 8 whilst the driver 11 is extended.

Figure 67:
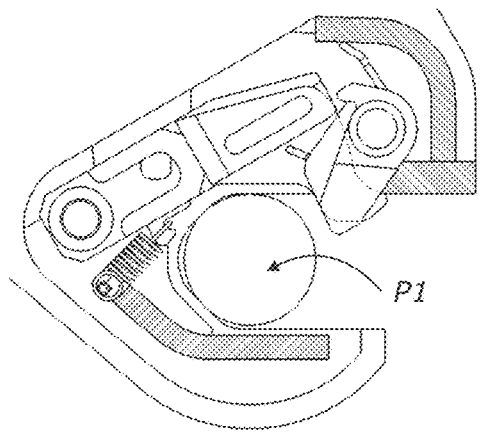
FIG. 67-83: show detailed side schematic views of a pin of an attachment egressing a third version retaining system.
Figure 68:
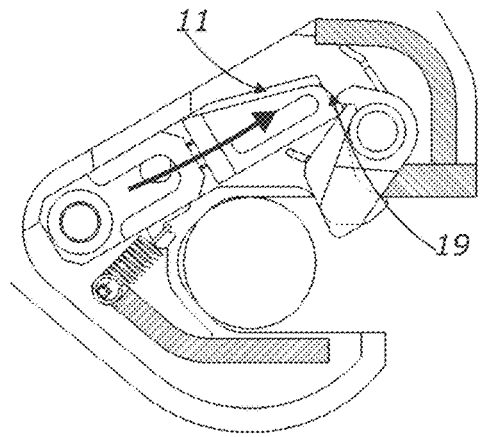
Figure 69:
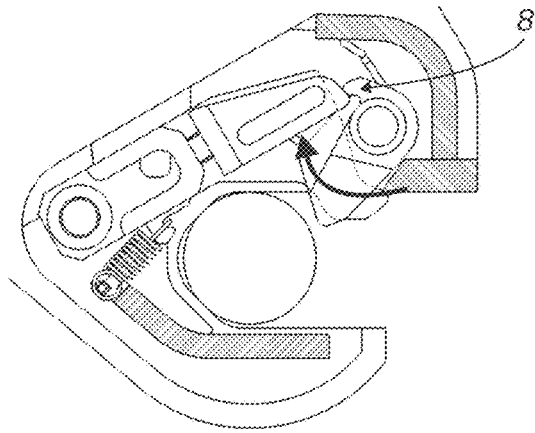
Figure 70:
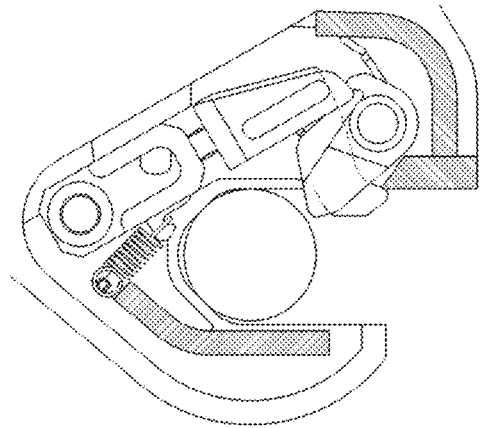
Figure 71:
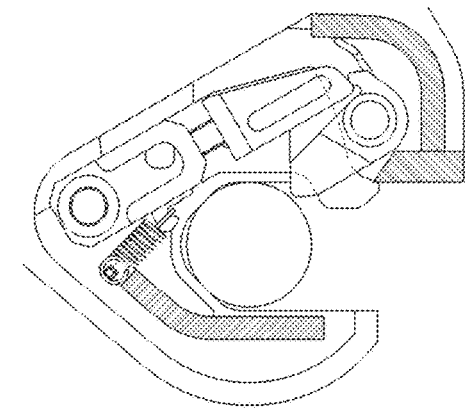
Figure 72:
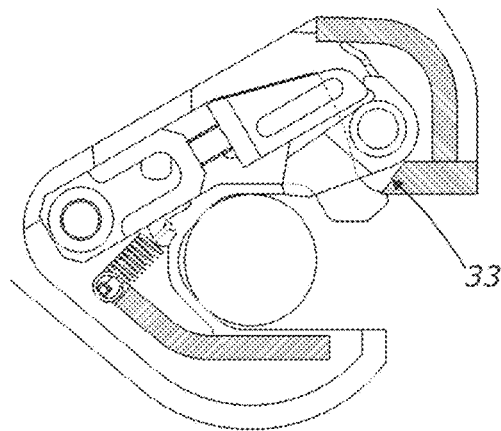
Figure 73:
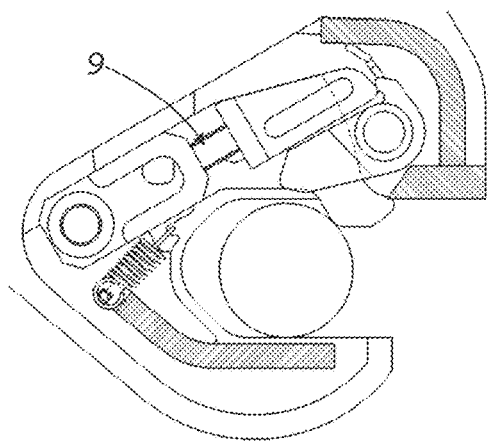

FIGS. 67-83 show a pin egressing the retaining system 1. FIG. 67 shows the pin P1 in an operational working mode captured at the receptacle. The driver 11 is retracted, the trigger 10 is biased downwards, the retainer 6 is biased downwards to lock the pin P1 in the receptacle R1, and the tripping region 25 extends into the passage P. FIG. 68 shows the driver 11 starting to extend via hydraulic pressure being applied to the driver actuator 9. FIG. 68-69 shows the driver 11 coupling region 19 starting to engage the retainer 6. FIGS. 69-70 shows the retainer 6 being rotated about its retainer shaft 17 until the retainer 6 reaches its rotational limit in FIG. 73 and so it is not occluding the passage P to prevent pin removal. At this stage, the operator/user can cause to move the retaining system 1 so that the pin P1 can egress from the receptacle R1 via the passage P.

Figure 74:
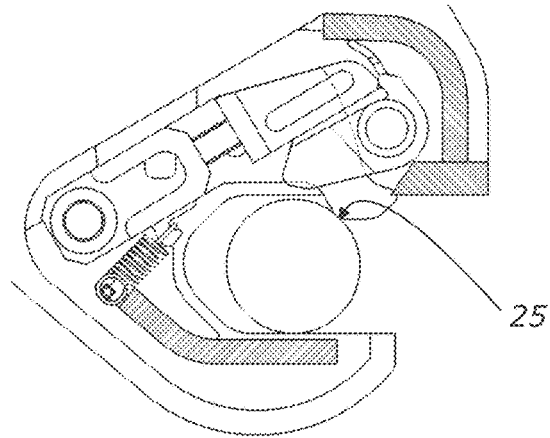
Figure 75:
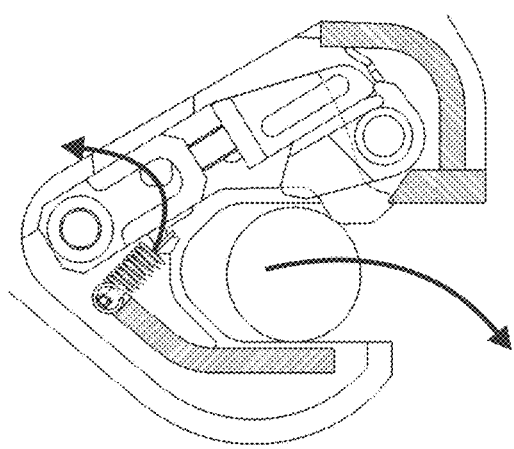
Figure 76:
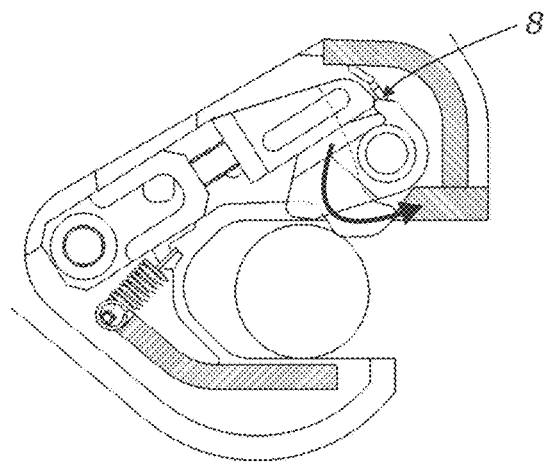
Figure 77:
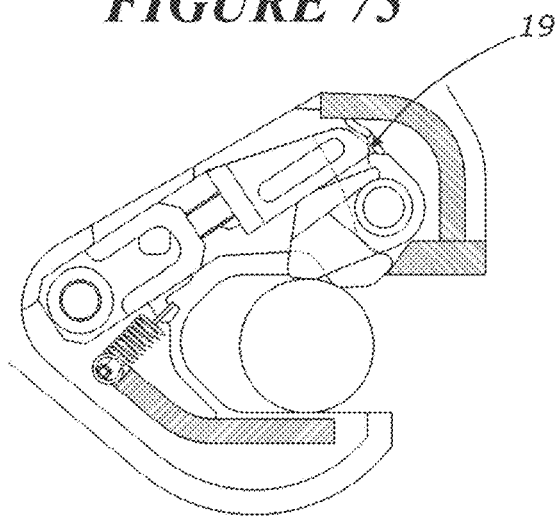
Figure 78:
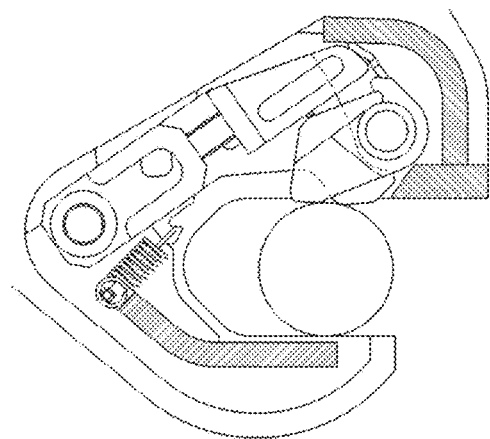

FIG. 74 shows the pin P1 starting to interfere with the tripping region 25 of the trigger 10. This causes the driver to lift up and out of operative contact with the lug 8. FIG. 76 shows the lug 8 of the retainer 6 at the crux of losing contact with the coupling region 19 of the driver 10. FIG. 77 shows the lug 8 of the retainer 6 passing past the coupling region 19 to allow the retainer 6 to start rotating back to its retaining position—to be stopped by a rotational stop 33 (Shown in FIG. 72). At this stage the pin P1 is still lifting the driver 11 and trigger 10 upwards to fully release the retainer 6 from the driver 10. FIG. 78 shows the retainer 6 and associated lug 8 fully clear of the driver 10 and associated coupling region 19.

Figure 79:
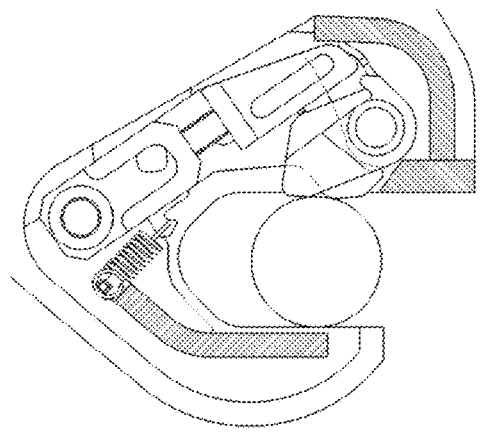
Figure 80:
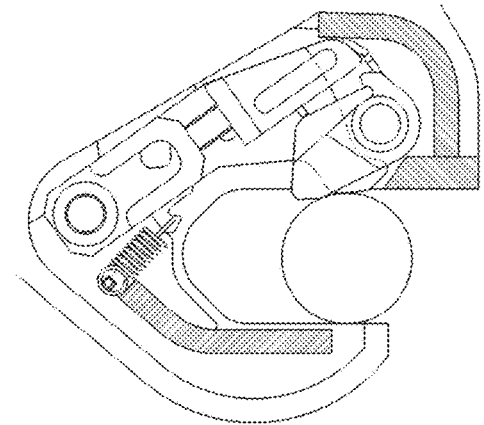
Figure 81:
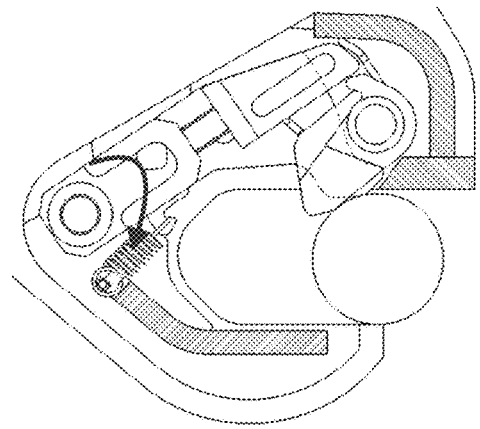
Figure 82:
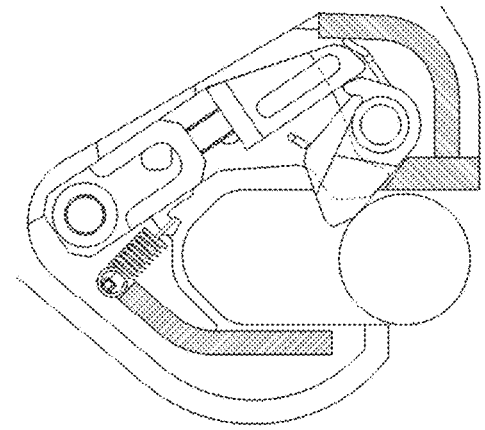
Figure 83:
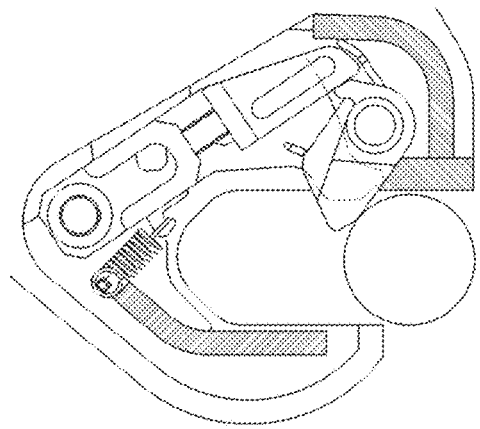

FIG. 79 shows the retainer 6 and the trigger 10 at their highest points, substantially fully or sufficiently retracted from the receptacle R1. From FIG. 80, the retainer 6 has started returning back to its biased position into the receptacle R1 as the pin leaves the receptacle R1. The trigger 10 is at its highest point in FIG. 80. In FIG. 81, the trigger 10 starts to enter and return into the receptacle R1. FIG. 83 is now in the stage that is seen in FIG. 58.

The geometry of the lug 8 and the driver 11 at the coupling region 19 should be such as to allow the coupling region 19 to be able to slide off the lug 8 when the retainer 6 is at, or close to, its rotational extent corresponding to being substantially clear of the receptacle R1. If there is too much undercut shape to the lug 8 the upward movement of the trigger by a pin may be prevented by the lug 8.

In the numerous embodiments the lug 8 is shown as being integral or attached with the retainer 6. However it is envisaged that the lug 8 or other coupling feature is separate or remote from the retainer 6, such as being attached to the rotational shaft of the retainer 6. The lug 8 may still be integral with the retainer 6 as the retainer 6 may also be integrally formed with its rotational shaft.

The position and shape of the trigger region 25 of the trigger relative to the operative regions of the retainer 6 are also important. As the pin P1 leaves the receptacle R1, as seen in FIG. 73-83, the pin P1 should contact the trigger region 25 at an advancing direction facing surface of the pin P1 and subsequently allow the retainer 6 to rotate back into the receptacle R1 after the pin P1 has advanced sufficiently in an outward direction from the receptacle R1. The retainer 6 should be shaped and/or positioned to not contact an advancing direction facing surface of the pin P1 in a manner to prevent further advancement of the pin P1 out of the receptacle R1. Ideally the retainer 6 may contact with the pin P1, as the pin P1 advances out of the receptacle R1, with a trailing direction facing surface of the pin P1.

In an alternative embodiment (not shown) the coupling region 19 of the driver 11 is a geared rack type feature. A complementary geared rack, surface or gear—which acts to achieve a similar function to the lug 8—is located on or integral with the retainer 6. Linear action of the driver back and forth moves the geared rack coupling region to drive the rack, when engaged to the coupling region, on the retainer 6. A trigger may still act upon this geared linear driver to decouple and couple the geared driver with the retainer 6. Disadvantages of geared system is that the teeth of a geared system may wear faster than single surface engagements, or debris may inhibit functionality.

In an alternative embodiment (not shown) the coupling region of the driver is a geared rack or gear, which acts to achieve a similar function to the lug, but it is driven by a rotationally driven driver. I.e. the driver does not have a linear action, it is instead a rotationally driven gear wheel that has teeth to act as a coupling region to engage with like teeth on a retainer 6. A trigger may still act upon this geared rotational driver to de-couple and couple the geared driver with the retainer 6. The coupling and the de-coupling may be in a form of a mechanical system de-coupling or a de-coupling of the hydraulic/electric drive. The geared driver may be located on the end of a lever that is pivoted, and when triggered, the lever is lifted up to de-couple the geared driver from the gears of the retainer 6. In alternative embodiments, the geared driver may have a hydraulic de-coupling so that the geared driver is able to free rotate when de-coupled, to allow the retainer 6 to bias back to its passage occluding position. In a further alternative embodiment of this alternative embodiment, the driver may be torsionally biased to rotate backwards to rotate the retainer 6 back to its occluding position, instead of the retainer being torsionally biased. Alternatively, both the driver and the retainer may be torsionally biased so as they are biased to rotate back to their rotational starting positions. In this embodiment, the driver may not be a full geared wheel, it may be a section/periphery of teeth between a chord that rotate about a shared pivot axis.

In other embodiments however, some of which are shown in the figures and described herein, the coupling region 19 and lug 8 are not a geared interface. The coupling region 19 and lug 8 have a sliding, gliding, abutting and/or single surface engagement. Benefits of such may allow reduced wear, chance of catching debris and/or manufacturing tolerances compared with geared or more complex or other systems. This can also be stated for the engagement (where there is engagement) of the retainer 6 or lug 8 with the guiding surface 8.

In an alternative embodiment (not shown) the coupling region 19 is a shaft or axle that shares a rotational axis with the one or more retainers 6. The axle is driven directly or indirectly by a driver such as a hydraulic or electric motor. Rotation of the retainers 6 to move them from their occluding to the raised position is via drive of the motor to drive the axle to rotate and drive the retainers 6. To allow the coupling of the motor from the retainers 6, the trigger system would need to trigger either a) the drive of the motor, i.e. a hydraulic or electric de-coupling to allow the motor to free spin to release the retainers 6 from their raised positions, or b) a mechanical trigger that is able to de-couple the motor to the retainers to allow the retainers 6 to bias back to their occluding positions.

Figure 84:
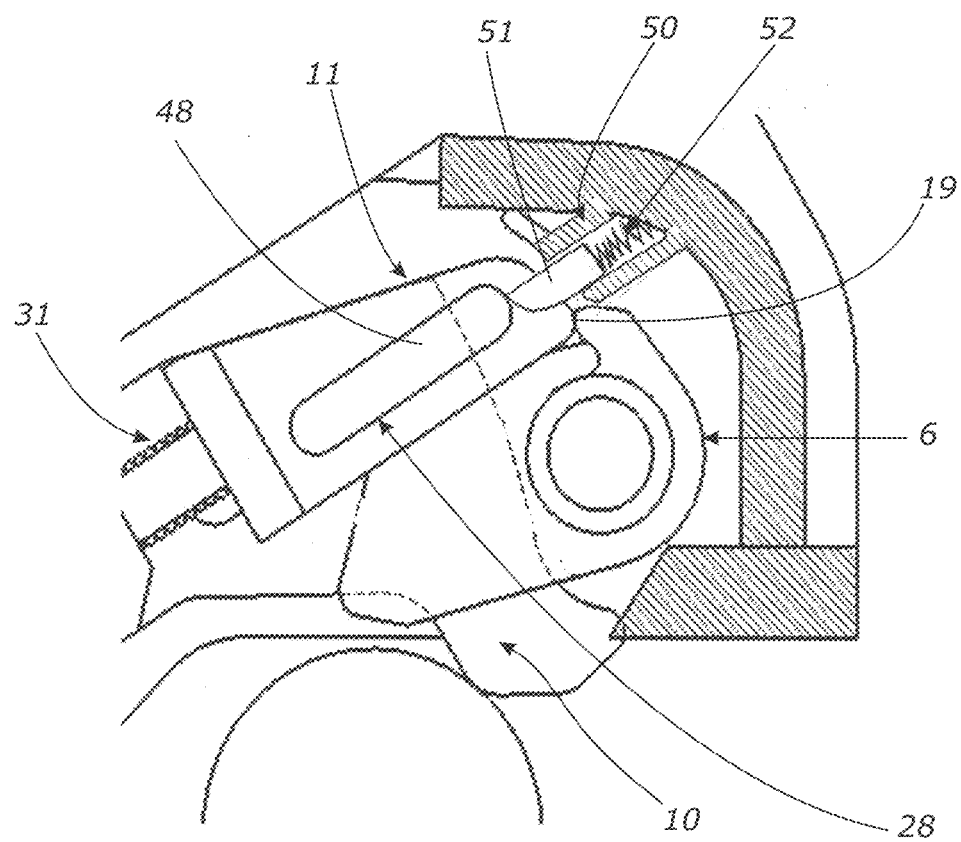
FIG. 84: shows a detailed side schematic view highlighting a latching system for a driver.

In an alternative embodiment, as shown in FIG. 84, the guiding surface 28 is now located below the protrusion 48. The guiding surface 20 does not have interaction with the retainer 6 or lug 8. Instead a spring latch system 50 is able to catch and prevent the driver 11 from engaging with the lug 8 of the retainer 6 after the driver 11 has been fully extended and triggered upwards to decouple. This allows the retainer 6 to move rotationally back to its occluding position in the passageway without engaging or contacting the driver 11 again until it moves back to its first position. The driver 11 when triggered by the trigger 10 is pushed above a latch 51 of the spring latch system 50. Once a portion of the driver 11, in this embodiment the protrusion 48, is above the latch 51, the driver 11 is prevented from biasing downwards to contact the retainer 6. When the driver 11 is retracted, the protrusion slides off the latch 51 to allow the driver 11 to rotationally bias back to its original position. The spring 52 of the spring latch system 50 allows the latch 51 to slide a distance under the guiding surface 28 as the driver 11 driven upwards by the trigger 10. Having the driver raised, and then held by the latch 51 allows the retainer to rotate freely without interaction with the driver.

In an alternative embodiment (not shown) to the embodiment shown in FIG. 84, the driver 11 may be guided by a path or slot. As the driver 11 extends to drive the retainer 6 to its raised position, the driver 11 follows a first extend path. As the driver 11 is triggered upwards, the driver 11 enters a return path, when the driver 11 retracts, the driver 11 follows the return path. The return path prevents interaction between the driver 11 and the retainer 6, as the retainer 6 returns to its occluding position. As such the guiding surface 28, does not have interaction with the retainer 6 or lug 8. Instead the guiding surface 28 is part of the slot, which is fixed relative the body of the coupler, and the engaging surface 28 engages with a part of the driver 11.

Further advantages with respect to the hydraulics provided as standard on an excavator are that the standard 4/2 valve that is supplied with most excavators can be utilised for the current system without any modification. The hydraulic system is shown in FIG. 52, with a standard 4/2 valve 41 schematically shown. The coupler hydraulic system 42 that is supplied with the coupler C is shown with the second retainer 3 hydraulic ram 40 and first retainer 6 hydraulic ram 9. A RETRACT and EXTEND line are illustrated, corresponding to hydraulic line that when pressurised operates retraction of the ram 40 and a hydraulic line that when pressurised operates extension of the ram 40 respectively.

In modern machines the hydraulic system pressure may drop, sometimes quickly, to conserve fuel. This may cause issues with the retraction and extension of the hydraulic ram 9 that indirectly actuates the retainer 6. This is because if there is a lack of pressure during unlocking of the front pin P1, then the hydraulic ram 9 may retract, before it has been able to fully extend to completely unlock the receptacle R1 by rotating the retainer 6 from the opening of the receptacle R1.

Addition of a pilot check valve 44 improves the usability of the system with such modern machines. The addition of a pilot check valve 44 is not essential on all systems.

Figure 53:
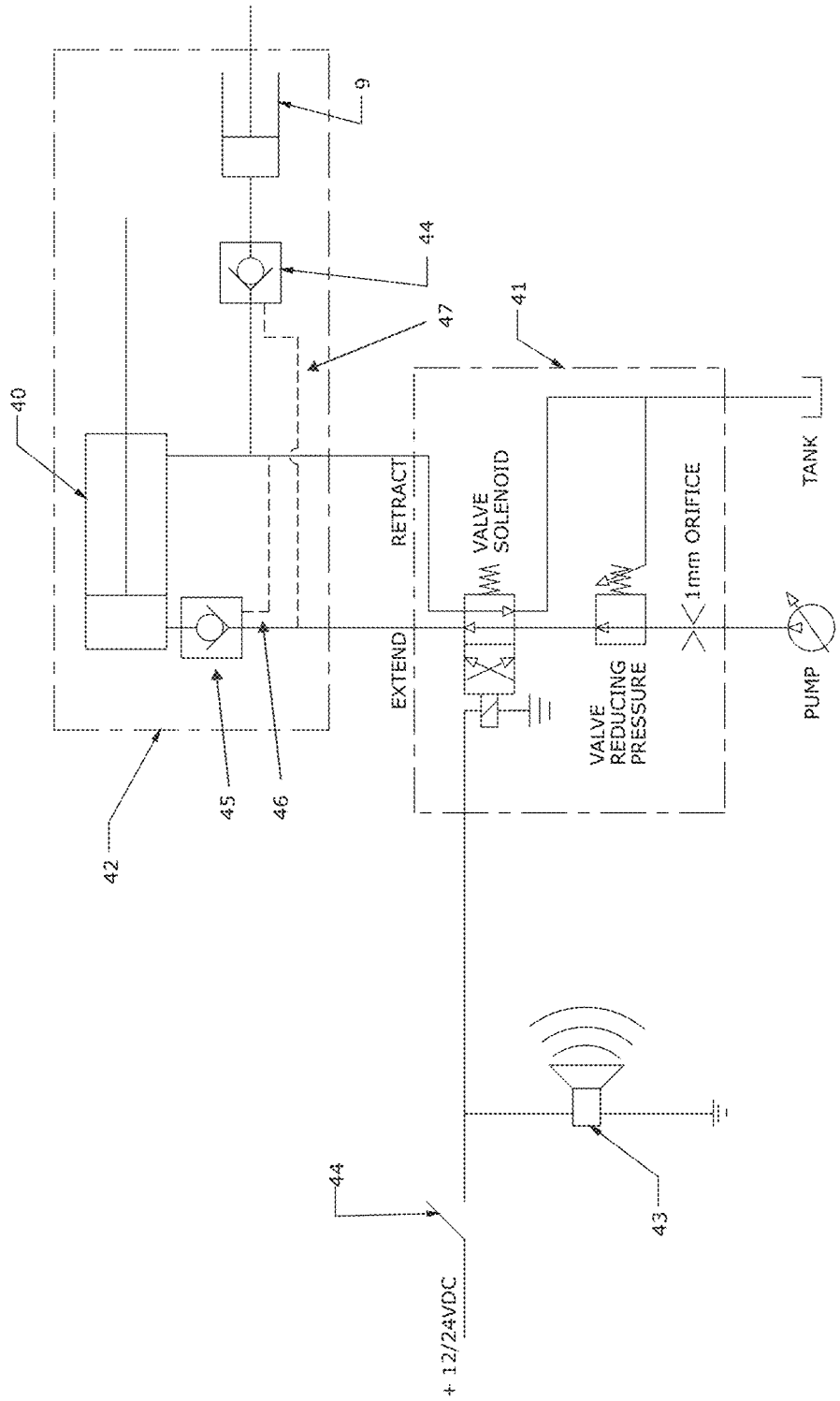
FIG. 53: shows a schematic of an alternative hydraulic system.

An example of a hydraulic circuit with a pilot check valve 44 for the hydraulic ram 9 is shown in FIG. 53. The pilot check valve 44 prevents the hydraulic ram 9 from retracting, or at least reduces the speed or rate of retraction, during the retraction (unlocking) procedure. This may be achieved by having the hydraulic ram 9 being feed from the RETRACT line, with an intermediary check valve 44 to prevent fluid from returning from the hydraulic ram 9 to the RETRACT line if the RETRACT line fluid pressure drops off.

A side effect of the check valve 44 is that then the hydraulic ram 9 cannot retract. This is overcome by having a pilot line 47, running from the 'high' pressure EXTEND line to the pilot check valve 44, to open the pilot check valve 44 during operation of the EXTEND circuit. When high pressure is fed through the EXTEND circuit, the pilot check valve 44 is opened to allow fluid to flow into the low pressure (RETRACT) line back to the TANK. The hydraulic ram 9 retracts due to its spring bias from spring 31. Alternatively the pilot line 47 may be fed from other regions of the EXTEND circuit, such as after the pilot valve 45, and before the ram 40, or off the ram 40.

The hydraulic ram 40 may also have a respective pilot check valve 46 to prevent the second retainer 3 and hydraulic ram 40 from retracting whilst the coupler is in the locked position, and there is no high pressure coming from the EXTEND line. A side effect of the check valve 45, is that the hydraulic ram 40 can then not retract. To overcome this the pilot check valve 46 has a corresponding pilot line 46 to open the pilot check valve 46. The pilot line 46 is fed from the RETRACT line.

Whilst pressure is being driven through the EXTEND line, the hydraulic ram 40 extends. When pressure is released, or reduced, from the EXTEND line, the hydraulic ram 40 is prevented or restricted from retracting due to the pilot check valve 44. This is desirable as a safety feature, where the second retainer 3 (attached to the hydraulic ram 40) won't retract (and open up the passage P) unless a user applies pressure to the RETRACT line.

It is envisaged that there are many ways to configure the hydraulic circuit so it can be used with a standard 4/2 valve, yet still comprise the benefits described above.

In some embodiments a sound may be emitted via a speaker 43 when the operator enters a particular mode. In a preferred embodiment as shown in FIG. 52 a lock out switch 44 is present also. When the switch 44 is activated by the operator, the coupler hydraulic system can be used. In the preferred embodiment, simultaneously when the switch 44 is activated, a buzzer 43 sounds. In this preferred embodiment, there can be no accidental release of any pins P1 or P2 without activation of the switch 44, which would allow the hydraulics system to be operate, to release either of the retainers 3 and 6.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

What is claimed is:

1. A coupler for securing an attachment to an earth working machine, the coupler comprising:
    a coupler body that comprises a receptacle comprising a mouth opening via which a pin of the attachment can pass to move through a passage of the receptacle to a captive region of the receptacle;
    a retainer movably presented from and relative to the coupler body, the retainer being biased to a first position in which the retainer occludes the passage sufficiently to prevent the pin from moving out of the captive region, yet being movable to a second position relative the passage;
    and
    a driver movably presented from and relative to the coupler body and able to be (a) coupled with the retainer, to allow the retainer to be moved by the driver to the retainer's second position and (b) decoupled from the retainer, preventing the driver from moving the retainer between the retainer's first and second positions,
    wherein the retainer and the driver thereby allow:
    (i) ingress of said pin into the captive region when a forcing of said pin against the retainer moves the retainer towards said second position against the retainer's bias; and
    (ii) egress of said pin from the captive region, when the driver is coupled with the retainer and the driver has moved the retainer to its second position,
    wherein the coupler further comprises a trigger that is movable relative the coupler body in a manner to be engaged and able to be moved by said pin as the pin moves through the passage in a manner so that the trigger can, when so moved by said pin, cause the driver to decouple from the retainer, as said pin egresses the captive region.

2. The coupler as claimed in claim 1, wherein the trigger can cause a coupled retainer and driver to decouple so that the retainer, if not in the retainer's first position, is able to move to the retainer's first position under influence of the retainer's bias.

3. The coupler as claimed in claim 1, wherein the trigger can cause a coupled retainer and driver to move relative each other to decouple so that the retainer is not held from moving to the retainer's first position by the driver.

4. The coupler as claimed in claim 1, wherein the driver is mounted relative the coupler body to move in a rotational manner for moving between the driver's coupled and decoupled condition.

5. The coupler as claimed in claim 1, wherein the trigger is mounted relative the coupler body to move in a rotational manner relative the coupler body.

6. The coupler as claimed in claim 1, wherein the driver is mounted to move in a rotational manner relative the coupler body for moving between a coupled and decoupled condition and the trigger is mounted to move in a rotational manner relative the coupler body, each of the driver and trigger about a common rotational axis.

7. The coupler as claimed in claim 1, wherein the driver is located by the coupler body and can be actuated to move relative to the coupler body to move the retainer to its second position when coupled with said retainer.

8. The coupler as claimed in claim 1, wherein the retainer is mounted relative to the coupler body and able to move relative the coupler body in rotational manner.

9. The coupler as claimed in claim 1, where the retainer is able to move between the retainer's first position where it projects from the coupler body at least partially across the receptacle sufficiently to occlude the passage of the pin out of the captive region and its second position where passage of the pin out of the captive region is not occluded by the retainer.

10. The coupler as claimed in claim 1, wherein the retainer extends across the receptacle more when in the retainer's first position than when in the retainer's second position.

11. The coupler as claimed in claim 1, wherein the retainer is prevented from moving away from the second position, when in the first position.

12. The coupler as claimed in claim 1, wherein the driver and the retainer have mutually co-operable coupling surfaces or members acting as a coupling, operatively engaged together when the driver is in its coupled condition and operatively disengaged when the driver is in its decoupled condition.

13. The coupler as claimed in claim 12, wherein the coupling comprises a retainer lug of the retainer and a coupling surface of the driver able to couple with the retainer lug to couple the retainer and the driver, and the retainer lug is located radially away from the retainer axis to allow, when coupled, the driver to apply a rotational torque to the retainer in a direction and move the retainer towards its second position.

14. The coupler as claimed in claim 1, wherein the driver and trigger are mounted together to the coupler body to be able to move in concert rotationally relative the coupler body and the driver is able to move at least one of rotationally and rectilinearly relative to the trigger.

15. The coupler as claimed in claim 1, wherein the driver and trigger are mounted together to the coupler body to be able to move in concert rotationally relative the coupler body and the driver is able to move rectilinearly relative to the trigger.

16. The coupler as claimed in claim 1, further comprising a driver actuator coupled to the driver to cause the driver to move in a manner able to move the retainer.

17. The coupler as claimed in claim 16, wherein the driver actuator and the trigger are mounted together and to the coupler body, the driver actuator able to cause the driver to move in a rectilinear manner relative the trigger.

18. The coupler as claimed in claim 16, wherein the driver actuator is hydraulic and, when actuated, is able to cause the driver to move in a direction to, when the driver is coupled to the retainer, move the retainer to or towards its second position.

19. The coupler as claimed in claim 16, wherein the driver actuator, when de-actuated, will allow the driver to move in a direction to, when coupled to the retainer, allow the retainer to move towards its first position.

20. The coupler as claimed in claim 16, wherein the bias acting on the retainer is sufficiently strong that when the driver actuator is de-actuated, and the driver is coupled to the retainer, the bias can move the retainer towards its first position.

* * * * *